US010963567B2

(12) United States Patent
Johnson et al.

(10) Patent No.: US 10,963,567 B2
(45) Date of Patent: Mar. 30, 2021

(54) SPECULATIVE SIDE-CHANNEL ATTACK MITIGATIONS

(71) Applicant: MICROSOFT TECHNOLOGY LICENSING, LLC, Redmond, WA (US)

(72) Inventors: Kenneth D. Johnson, Seattle, WA (US); Jonathan E. Lange, Bellevue, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 225 days.

(21) Appl. No.: 15/990,230

(22) Filed: May 25, 2018

(65) Prior Publication Data
US 2019/0114422 A1 Apr. 18, 2019

Related U.S. Application Data

(60) Provisional application No. 62/571,550, filed on Oct. 12, 2017.

(51) Int. Cl.
*G06F 9/30* (2018.01)
*G06F 21/56* (2013.01)
(Continued)

(52) U.S. Cl.
CPC ........ *G06F 21/566* (2013.01); *G06F 9/30043* (2013.01); *G06F 9/30058* (2013.01);
(Continued)

(58) Field of Classification Search
CPC combination set(s) only.
See application file for complete search history.

(56) References Cited

U.S. PATENT DOCUMENTS 7,610,448 B2 * 10/2009 Buxton ............... G06F 9/30047
711/118
2002/0087849 A1 * 7/2002 Arimilli ............. G06F 9/30087
712/235
(Continued)

OTHER PUBLICATIONS

Oleksenko, et al., "You Shall Not Bypass: Employing data dependencies to prevent Bounds Check Bypass", Retrieved from https://arxiv.org/pdf/1805.08506.pdf, May 22, 2018, 5 Pages.
(Continued)

*Primary Examiner* — Khoi V Le
(74) *Attorney, Agent, or Firm* — Workman Nydegger

(57) ABSTRACT

Preventing the observation of the side effects of mispredicted speculative execution flows using restricted speculation. In an embodiment a microprocessor comprises a register file including a plurality of entries, each entry comprising a value and a flag. The microprocessor (i) sets the flag corresponding to any entry whose value results from a memory load operation that has not yet been retired or cancelled, or results from a calculation that was derived from a register file entry whose corresponding flag was set, and (ii) clears the flag corresponding to any entry when the
(Continued)

operation that generated the entry's value is retired. The microprocessor also comprises a memory unit that is configured to hold any memory load operation that uses an address whose value is calculated based on a register file entry whose flag is set, unless all previous instructions have been retired or cancelled.

20 Claims, 9 Drawing Sheets

(51) Int. Cl.
  *G06F 9/38* (2018.01)
  *G06F 21/75* (2013.01)
  *H04L 9/00* (2006.01)
  *G06F 21/52* (2013.01)
(52) U.S. Cl.
  CPC ...... *G06F 9/30098* (2013.01); *G06F 9/30105* (2013.01); *G06F 9/3842* (2013.01); *G06F 9/3865* (2013.01); *G06F 21/52* (2013.01); *G06F 21/75* (2013.01); *H04L 9/003* (2013.01); *G06F 2221/034* (2013.01)

(56) References Cited

U.S. PATENT DOCUMENTS

| | | | |
|---|---|---|---|
| 2014/0059688 A1* | 2/2014 | Margalit | G06F 21/561 |
| | | | 726/24 |
| 2015/0089190 A1* | 3/2015 | Gonion | G06F 9/3013 |
| | | | 712/7 |
| 2015/0347760 A1* | 12/2015 | Kruglick | G06F 21/755 |
| | | | 726/25 |
| 2015/0350239 A1* | 12/2015 | Kruglick | G06F 9/45558 |
| | | | 726/23 |
| 2015/0373036 A1* | 12/2015 | Patne | G06F 21/755 |
| | | | 726/23 |
| 2016/0117503 A1* | 4/2016 | Reed | H04L 9/3247 |
| | | | 726/23 |
| 2018/0046808 A1* | 2/2018 | Cammarota | G06F 21/75 |

OTHER PUBLICATIONS

"International Search Report and Written Opinion Issued in PCT Application No. PCT/US2018/054488", dated Jan. 24, 2019, 12 Pages.

* cited by examiner

SPECULATIVE SIDE-CHANNEL ATTACK MITIGATIONS

CROSS-REFERENCE TO RELATED APPLICATION

This application claims priority to, and the benefit of, U.S. Provisional Patent Application Ser. No. 62/571,550, filed Oct. 12, 2017, and titled "SPECULATIVE SIDE-CHANNEL ATTACK MITIGATIONS," the entire contents of which are incorporated by reference herein in their entirety.

BACKGROUND

In computing, "side channel attacks" are a class of techniques used to leak information about a sensitive computation through externally visible side effects of performance of that computation. Through targeted analysis, these externally visible side effects may encode information about a sensitive value. In the context of cryptography, for example, memory access patterns made by privileged software performing a cryptographic operation may vary based on a secret cryptographic key's value. Thus, the latency of subsequent memory operations—which are observable to unprivileged software—may encode information about secret key values used by the privileged software as index into lookup tables or substitution boxes that are common to many cryptographic algorithms. Since side channel attacks have been considered a serious issue for cryptographic software, mitigations have been crafted, such as careful tailoring of cryptographic operations to be constant time with respect to any sensitive key material.

Side channel attacks are also possible within other domains. For example, a "speculative" side channel attack may leak arbitrary sensitive data by utilizing observable side effects resulting from the speculative out-of-order instruction execution designs used by modern high-performance processors. In particular, speculative side channel attacks may leverage timing artifacts of a processor's speculative execution hardware in order to leak secret memory content used by privileged software designed to protect such secret memory content (e.g., an operating system, a hypervisor, etc.).

One example of a speculative side channel includes an instruction execution sequence that speculatively, during an out-of-order instruction execution flow, issues a load from a privileged memory location containing a secret, and then accesses additional unprivileged-accessible cache lines using the contents from the first load as an index. While the computations performed during this speculative execution flow would eventually be rolled back by the out-of-order machine if it is later determined that they were mispredicted, the side effects of these computations (e.g., the cache lines accessed using sensitive memory contents as an index) are still externally visible to unprivileged software by measuring such things as memory latency after any mispredicted instructions have been cancelled.

Various techniques exist for unprivileged software to cause a mispredicted speculative execution flow by privileged software. For example, during execution of privileged software, unprivileged software may cause an out-of-order machine to execute a mispredicted speculative execution flow in the privileged software (e.g., by making calls into the privileged software in such a way that causes the out-of-order machine to mispredict a branch), and then observe side-effects of that mispredicted speculative execution flow. Techniques also exist for unprivileged software to extend the length of time for the misprediction to be resolved, thereby increasing the chance that useful data can be leaked from the predicted out-of-order instruction flow is canceled by the out-of-order machine.

BRIEF SUMMARY

At least some embodiments described herein are directed to processor modifications that prevent the observation of the side effects of mispredicted speculative execution flows. In one embodiment, a processor's register file can be extended to include, for each entry, a "pending" flag that indicates if the value in the entry (i) results from a memory load operation that has not yet been retired or cancelled, or (ii) results from a calculation that was derived from a register file entry whose corresponding flag was set. The register file can then be configured to clear the flag corresponding to any entry when the operation that generated the entry's value is retired. In connection with these flags, the processor's memory unit(s) can be configured to hold any memory load operation that uses an address whose value is calculated based on a register file entry whose flag is set, unless all previous instructions have been retired or cancelled. As such, the processor can make use of speculative execution after a branch or conditional load, but avoid performing any operation that could cause observable side-effects if the operation was mispredicted.

Accordingly, embodiments may include methods, systems, and/or computer program products implementing a microprocessor that includes a register file comprising a plurality of entries, and in which each entry comprises a value and a flag. The microprocessor is configured to set the flag corresponding to any entry whose value results from a memory load operation that has not yet been retired or cancelled, or results from a calculation that was derived from a register file entry whose corresponding flag was set. The microprocessor is also configured to clear the flag corresponding to any entry when the operation that generated the entry's value is retired. The microprocessor also includes a memory unit that is configured to hold any memory load operation that uses an address whose value is calculated based on a register file entry whose flag is set, unless all previous instructions have been retired or cancelled.

In another embodiment, a processor can be extended to include one or more speculation buffers, such as a speculative L1 data cache, a speculative translation lookaside buffer, etc. Then, when a speculative memory load occurs, and the requested data is not in conventional caches/buffers, the data can be filled into the speculation buffer(s) instead. Later, if the load had been correctly predicted, this data can be committed to the conventional caches/buffers. If the load had been incorrectly predicted, however, this data could be discarded from the speculation buffer(s). These embodiments may also avoid observable side effects to additional cache layers by filling the cache hierarchy from the "inside out" rather than from the "outside in."

Accordingly, embodiments may include methods, systems, and/or computer program products implementing a microprocessor that includes one or more speculation buffers that are separated from and correspond to one or more conventional buffers. The microprocessor includes first logic that records the effects of one or more speculatively-executed instructions to the one or more speculation buffers, and that records the effects of non-speculatively-executed instructions to the one or more conventional buffers. The microprocessor also includes second logic that (i) commits the recorded effects from the one or more speculation buffers to the one or more conventional buffers when the one or more speculatively-executed instructions that generated the effects are committed, and that (ii) discards the effects from the one or more speculation buffers when the one or more speculatively-executed instructions are cancelled.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

At least some embodiments described herein are directed to processor modifications that prevent the observation of the side effects of mispredicted speculative execution flows. In one embodiment, a processor's register file can be extended to include, for each entry, a "pending" flag that indicates if the value in the entry (i) results from a memory load operation that has not yet been retired or cancelled, or (ii) results from a calculation that was derived from a register file entry whose corresponding flag was set. The register file can also be configured to clear the flag corresponding to any entry when the operation that generated the entry's value is retired. In connection with these flags, the processor's memory unit(s) can be configured to hold any memory load operation that uses an address whose value is calculated based on a register file entry whose flag is set, unless all previous instructions have been retired or cancelled. As such, the processor can make use of speculative execution after a branch or conditional load, but avoid performing any operation that could cause observable side-effects if the operation was mispredicted.

In another embodiment, a processor can be extended to include one or more speculation buffers, such as a speculative L1 data cache, a speculative translation lookaside buffer, etc. Then, when a speculative memory load occurs, and the requested data is not in conventional caches/buffers, the data can be filled into the speculation buffer(s) instead. Later, if the load had been correctly predicted, this data can be committed to the conventional caches/buffers. If the load had been incorrectly predicted, however, this data could be discarded from the speculation buffer(s). These embodiments may also avoid observable side effects to additional cache layers by filling the cache hierarchy from the "inside out" rather than from the "outside in."

Figure 1:
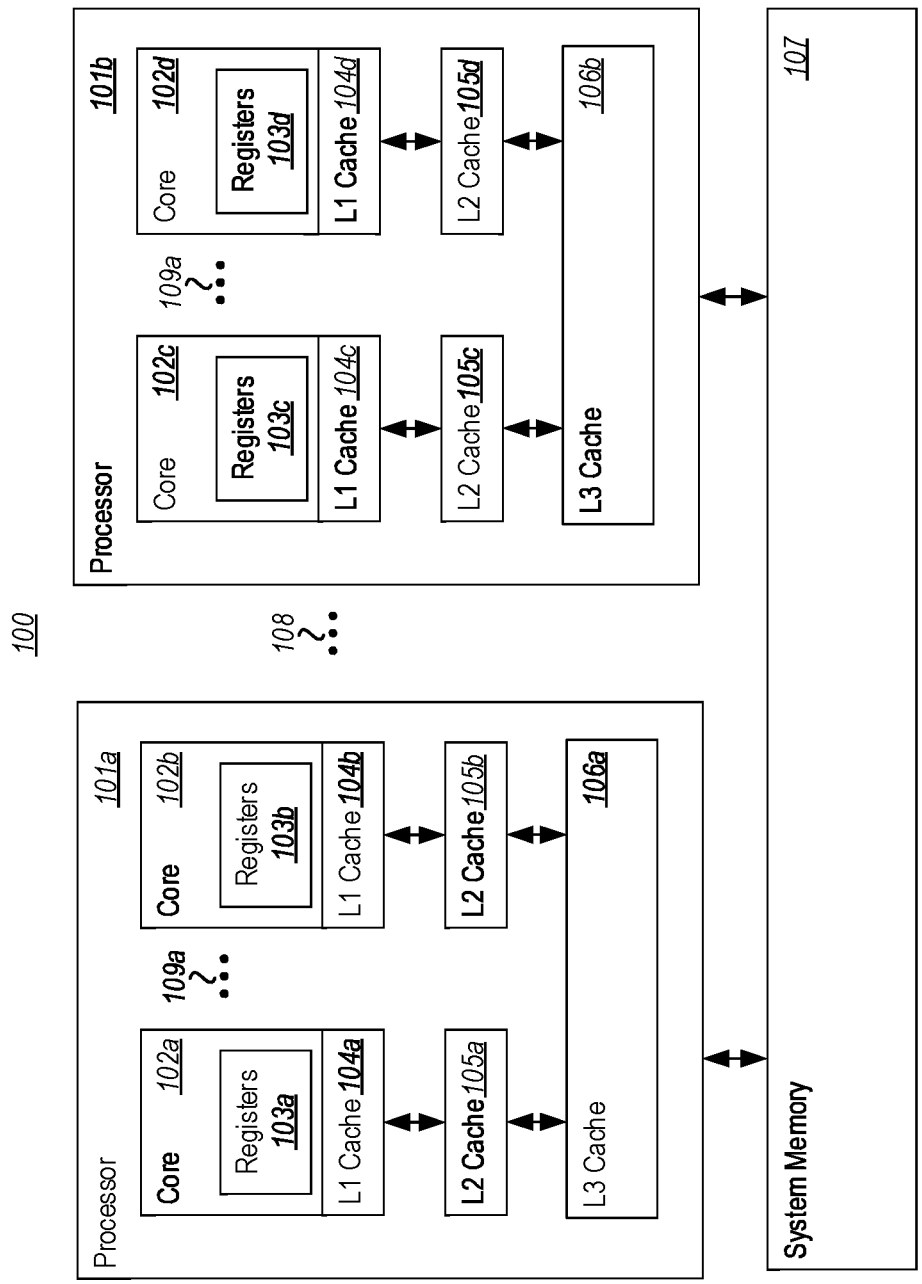
FIG. 1 illustrates an example architecture that is commonly employed by contemporary computers and computer microprocessors.

Initially, to facilitate an understanding of these techniques, FIG. 1 illustrates an example architecture 100 that is commonly employed by contemporary computers and computer microprocessors. In particular, FIG. 1 depicts two microprocessors 101a and 101b (referred to collectively as processor(s) 101), though as indicated by the ellipses 108 the principles described herein operate in environments having any number of processors (i.e., one or more). Each processor 101 is depicted as including two physical processing cores (i.e., cores 102a and 102b in processor 101a, and cores 102c and 102d in processor 101b, referred to collectively as core(s) 102). As indicated by the ellipses 109a/109b, the principles described herein operate in environments in which the processors 101 have any number of cores (i.e., one or more). These cores 102 are responsible for carrying out the primary computational operations of the processors 101, including executing executable instructions of application programs.

As shown, each core 102 can include corresponding registers 103a-103d (referred to collectively as registers 103). Registers comprise a (relatively) small amount of volatile memory used by the cores 102, for example, to store temporary values and to track various execution state. Each core 102 typically includes a plurality of individual registers, some used for specific purposes and some used as general-purpose storage. The particular number and type of registers 103 varies depending on processor manufacturer.

FIG. 1 also illustrates varies tiers of memory, including L1 cache memories 104, L2 cache memories 105, L3 cache 106 memories, and system memory 107. In general, system memory 107 is the primary operational memory of a computer system, and is typically volatile random-access memory (RAM), though other types of memories are possible. The size of system memory 107 varies widely depending on the size and capability of the computer system being implemented, and typically ranges from several hundred megabytes to tens of gigabytes (or more) in contemporary computer systems.

The cache memories are smaller memories used by the cores 102 to temporarily cache memory locations from the system memory 107 for quick read/write access. In the depicted architecture 100, each core 102 includes its own corresponding L1 cache 104 (i.e., L1 cache 104a for core 102a, L1 cache 104b for core 104b, etc.). An L1 cache 104 is the cache that is "closest" to the core(s) 102 (an often it is "built in" to the core), and typically has the lowest access speed and latency of all the caches, but also the smallest size. L1 caches typically range in the tens of kilobytes (e.g., 32 KB or 64KB) in contemporary processors. Each core 102 is also associated an L2 cache 105 (i.e., L2 cache 105a for core 102a, L2 cache 105b for core 104b, etc.). Each L2 cache is typically larger than its corresponding L1 cache, but has a slower access speed and latency than the L1 cache. L2 caches typically range in the hundreds of kilobytes (e.g., 256KB to 1024KB) in contemporary processors. While L2 caches have historically been embodied on chips separate from the processors 101, contemporary processors typically include the L2 caches. Each processor 101 may also be associated with an L3 cache 106a (though these are sometimes omitted in contemporary processors). L3 caches typically range in the single-digit megabytes (e.g., 1MB to 10MB) in contemporary processors. While L3 caches have historically been embodied on chips separate from the processors 101, contemporary processors typically include the L3 caches. Although not depicted, even higher cache levels (e.g., L4, L5, etc.) may also be used.

In general, when a core 102 needs access to data stored at a memory address that is not already cached in its L1 cache 104, a "cache miss" occurs, and that memory address is sought in the L2 cache 105. If it is not in the L2 cache 105, it is sought in the L3 cache 106 (if present), and so on, until it is retrieved from system memory 107. Similarly, if a memory address is "evicted" from the L1 cache 104, and the corresponding data has been modified, that eviction flows through the cache levels until the modified data is written to system memory 107.

Although not depicted, each core 102 may be enabled to carry out multiple "threads" of execution (typically two) at the same time. This is known a "hyper-threading" (HT). When a processor's 101 core(s) 102 are capable of HT, that processor 101 presents twice the number of available physical cores as "logical" or "virtual" cores. Thus, for example, if a processor 101 comprises a single physical core 102 capable of HT, it presents two logical cores, or if it comprises two physical cores 102 capable of HT, it presents four logical cores.

Multiple logical and/or physical cores 102 may share access to the same memory address at the same time (e.g., an address caches in an L1 cache 104 could be shared by two logical cores at the same physical core 102, and/or it could be cached in multiple L1 caches 104 at the same time). Since these multiple cores 102 may independently perform read and write operations on this shared memory address, modern processors employ cache coherence protocols (CCPs) to synchronize these operations across caches/cache levels to maintain a consistent data state. In general, CCPs maintain state information for each cache line (and potentially in relation to individual cores) and apply rules for synchronizing cache data based on changes in these states. Examples of common contemporary CCPs are MSI (i.e., cache states include modified, shared, and invalid), MESI (i.e., cache states include modified, exclusive, shared, and invalid), and MOESI (i.e., cache states include modified, owned, exclusive, shared, and invalid).

Figure 2:
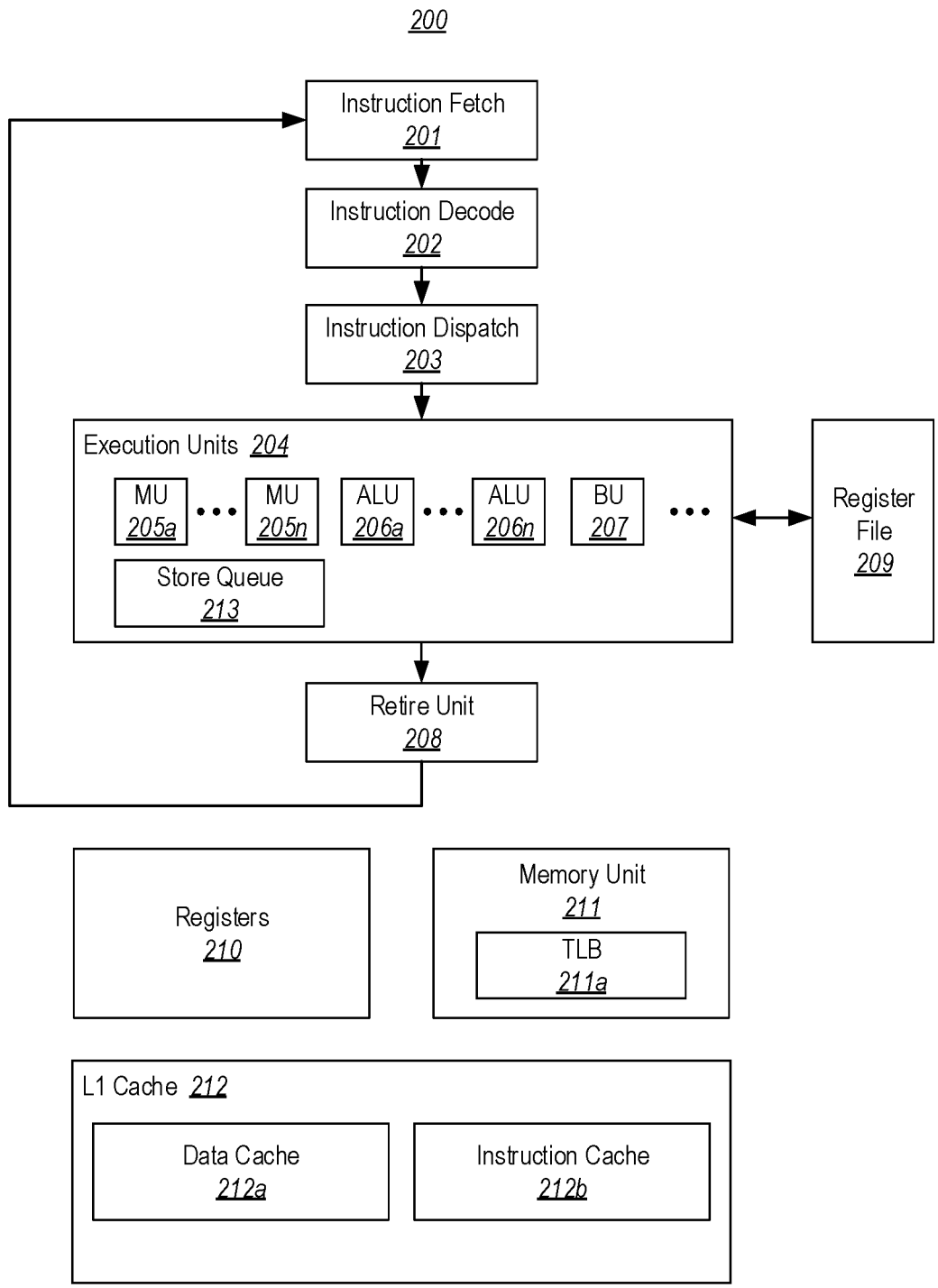
FIG. 2 illustrates an example architecture that depicts some components that may be part of a microprocessor.

FIG. 2 illustrates an example architecture 200 that depicts some components that may be part of a microprocessor (e.g., each physical core 102 of FIG. 1). Initially, each microprocessor may include components to fetch, decode, and dispatch executable instructions for execution (e.g., an instruction fetcher 201, an instruction decoder 202, and an instruction dispatcher 203). As its name signals, the instruction fetcher 201 fetches executable instructions from memory (e.g., from an instruction cache section 212b of its L1 cache 212; if the requested instructions are not in the L1 cache 212, a "cache miss" occurs, and the requested instructions are obtained from higher-level memory layers). Typically, the instruction fetcher 201 fetches a block of multiple executable instructions at a time.

The instruction decoder 202 decodes each fetched instruction, and typically breaks it into a plurality of smaller micro-operations for processing by various execution units 204. The instruction dispatcher 203 then dispatches these micro-operations to the appropriate execution unit 204, which independently performs its respective tasks. In contemporary high-performance processors, the instruction dispatcher 203 may dispatch the micro-operations in such a way that their processing is performed in parallel and often out-of-order with respect to the original instructions fetched by the instruction fetcher 201. The instruction dispatcher 203 does so to ensure that the execution units 204 remain as "busy" as practical. Instructions can be executed out-of-order since not all instructions are dependent on outputs from prior-executed instructions.

The particular types of execution units 204 varies from processor to processor, but common execution units include one or more memory units (i.e., MU 205a to 205n), one or more arithmetic logic units (i.e., ALU 206a to 206n), and a branch unit 207. As the number of individual execution units increases, the amount of potential parallelism in processing the micro-operations also increases. The MU's 205 are responsible for interacting with memory (i.e., reading from and writing to data in a data cache section 212a of its L1 cache 212; if the requested memory address(es) are not in the L1 cache 212, a "cache miss" occurs, and those memory addresses are obtained from higher-level memory layers). The ALU's 206 are responsible for performing arithmetic operations, such as adding, subtracting, multiplying, dividing, etc. The BU 207 is responsible for making branching/jumping decisions, and carrying out those branches/jumps.

Using this setup, a processor can continually fill a "pipeline," and execute instructions out-of-order and in parallel in this pipeline. For example, once the instruction dispatcher 203 has dispatched all of the micro-operations for the block of instructions fetched by the instruction fetcher 201 to the execution units 204, the instruction fetcher 201 can fetch a new block of instructions and continue the processes.

As the execution units 204 complete the micro-operations, the results of these operations flow into a retire unit 208. Based on these results, the retire unit 208 determines how to ensure that the instructions (fetched by the instruction fetcher 201) complete in the correct order. As depicted, output of the retire unit 208 loops back to the instruction fetcher 201 to communicate appropriate information for ensuring efficient and correct instruction execution.

If a core 102 implements HT, the instruction fetcher 201, the instruction decoder 202, and the instruction dispatcher 203 are typically "striped" to process multiple streams of instructions (typically two, resulting in two different threads of execution), while the execution units 204 and retire unit 208 process the micro-operations and results for each of these streams.

As an example, consider a stream of instructions shown in Table 1, as fetched by the instruction fetcher 201:

TABLE 1

| ID | Instruction | Comment |
|---|---|---|
| 1. | MOV R0 ← 0 | Move the value zero into register R1 |
| 2. | ADD R1 ← 0 | Add the value zero to the value register R1, and store the result in register R1 |
| 3. | MOV R2 ← 0 | Move the value zero into the register R2 |
| 4. | MOV R4 ← (R5) | Move the contents of the memory address stored in register R5 into register R4 |
| 5. | ADD R0 ← R0, 1 | Add the value one to the value in register R0, and save the result in register R0 |

TABLE 1-continued

| ID | Instruction | Comment |
|---|---|---|
| 6. | MOV R6 ← (R4) | Move the contents of the memory address stored in register R4 into register R6 |
| 7. | ADD R6 ← R1 | Add the values of registers R6 and R1, and place the result in register R6 |
| 8. | ADD R1 ← R0, 1 | Add the value one to the value in register R0, and save the result in register R1 |

Instructions 1-3 are all independent ALU operations, and thus their micro-operation(s) can be assigned to three different ALU's 206 for parallel execution. Instruction 5 is a memory operation that is also independent from instructions 1-3, and its micro-operation(s) can thus be assigned to a MU 205 for parallel execution with instructions 1-3. Instruction 5 relies on the results of instruction 1 as an input, and therefore starts after instruction 1 completes. However, it need not complete in any particular order with respect to instructions 2-4 or 6-7 (and it can thus be assigned to an ALU 206 for execution in parallel with these instructions). Instruction 6 relies on the results of instruction 4, and therefore starts after instruction 4 completes, while instruction 7 relies on the results of instructions 2 and 6. Instructions 7 and 8 may appear to have a dependency (i.e., register R1), though some processors can actually dispatch them in parallel, due to a register file 209.

The register file 209 provides additional storage that enables the same register to be used by different instructions/micro-operations at the same time. In particular, the register file 209 includes a number of entries, generally exceeding the number of available registers 210, that can be used by the execution units 204 instead of using the registers 210 themselves. Thus, entries in the register file 209 can be mapped to particular instructions, and these mapped entries in the register file are then used by these instructions instead of an actual register. For example, the register "R1" in instruction 8 may refer to one entry in the register file 209, while the register "R1" in instruction 7 refers to another entry. Then, as these instructions complete (i.e., "retire"), these mappings can be changed as appropriate to provide consistency and correctness in the use of R1.

The instruction fetcher 201 typically continues to fetch instructions as fast as the pipeline allows, with the goal of keeping the pipeline as full as possible (or practical). However, when the instruction fetcher 201 encounters a branch or conditional load instruction that could lead to two different paths of execution, there may be insufficient information to know which path should be taken. This is because, due to parallel out-of-order execution of the instructions leading up to the branch, some of the instructions that would provide the needed information have not completed. In these situations, contemporary processors may engage in "speculative" execution—i.e., the processor might make a guess as to which branch to take, and begin executing the instruction(s) in that branch. If the retire unit 208 determines that the guess was correct (e.g., based on results from the branch unit 207), the processor has been able to keep the pipeline busy and has made efficient use of its resources. If the retire unit 208 determines that the guess was incorrect, however, any of the work that had been performed on the incorrect branch may be discarded (e.g., the execution units 204 stop work on that branch and/or the retire unit 208 ignores the results; and any entries in the register file 209 that were used for the speculative execution are freed up) and execution on the alternate branch is commenced.

Thus, when a processor using architecture 200 is conducting "speculative" execution and a misprediction is made, the retire unit 208 ensures that the external architectural result is correct because the retire unit 208 does not commit any results unless they should be committed. However, even though the results of mispredicted execution are not committed/discarded, the processor has performed some work, and the side effects of this work having been performed can be used to infer what some of that work was.

Some instructions may need to be committed in-order. For example, any instruction/operation that writes to a memory location may not be able to be committed until the retire unit 208 determines that it should actually have executed. This is because committing a write to a memory location can have side-effect(s) that go beyond the register file 209. In order to facilitate performing speculative work on these types of instructions/operations, some processors associate the MU's 205 with a store queue 213 that queues memory operations that are ready to be pushed out to memory until the retire unit 208 has determined if those operations should actually be committed.

Other processors may stall these write operations within the MU's 205, themselves. Processors often operate on the concept of "the oldest operation in the machine." As the instruction fetcher 201 fetches instructions, it may tag each instruction with an identifier (e.g., sequence number) that is used to track the instruction's micro-operations as they flow through the pipeline. The retire unit 208 may only "retire" an instruction when it is the oldest one in the pipeline (e.g., based on using these identifiers). Thus, if an MU 205 stalls a write operation, the retire unit 208 may hold the operation until the retire unit 208 has determined that the operation is the "oldest operation in the machine."

Contemporary processors also include a memory unit 211. Memory units 211 are typically responsible for controlling the flow of data between the registers 210, the caches (e.g., L1-L3), and system memory 107. They also typically employ virtual addressing in order to allow use of memory spaces that do not correspond to the physical layout of system memory 107, and that are frequently larger than the system memory 107 itself. Thus, the memory unit 211 can provide translations between physical addresses in system memory 107, and virtual addresses. This is typically performed though use of page tables (stored in system memory 107) that map virtual addresses to physical addresses. Page tables typically operate based on deconstructing a virtual address into a page table index that is used to locate the appropriate mapping. A page table can also define access rights and other attributes (e.g., read only, read/write) for different addresses.

The process of the memory unit 211 locating a virtual to physical address mapping is known as a "page table walk" and is a relatively expensive operation (e.g., in terms of processing time/CPU cycles it takes to complete). As such, memory units 211 typically employ a translation lookaside buffer (TLB) 211a that stores recently located virtual to physical address translations, along with attributes (e.g., permissions, read/write attributes, etc.) of those addresses.

As part of speculative execution of operations that read from or write to memory, a MU 205 typically performs a TLB lookup for the appropriate address(es). If the proper mapping does not appear in the TLB, the MU 205 then typically initiates a page table walk. If the proper mapping is not found in the page table by the page table walk, an exception (e.g., page fault) may be raised, and the MU 205 may stall on the operation until the retire unit 208 instructs it to commit the operation. However, these table walks resulting speculative execution may be an avenue for speculatively-executed operations to affect external state (i.e., because the page table is stored in system memory 107).

In particular, some processors store attributes in the page table that provide information about whether a translation entry has been accessed. For example, some architectures associate each translation entry with an "accessed" flag and a "dirty" flag. In some implementations, the "accessed" flag is set when a table walk is performed in connection with a read operation, and the "dirty" flag is set when a table walk is performed in connection with a write operation. Different processor manufactures handle these flags in different ways when a page walk is performed due to a speculatively-executed operation. In some architectures, these flags cannot be affected by speculative operations. In other architectures, "accessed" flags can be affected by speculative operations, but "dirty" flags cannot. If speculative execution of an operation would cause a flag to change on a table walk, an MU 205 may stall the operation and hold it (e.g., until it is the oldest operation in the machine). If the table walk would not cause a flag change (i.e., because the entry was already flagged as accessed and/or dirty, the MU 205 might continue speculative processing of the operation (i.e., continuing the table walk and populating the TLB 211a).

If a virtual to physical address translation is located when performing speculative execution of a memory operation, the MU 205 may proceed to probe the data cache 212a for the memory address. This could cause a "cache miss" to occur to bring the data through the memory hierarchy and fill the data cache 212a. This could also involve additional data movement through various caches due the CCP. The MU 205 might then proceed with memory operations (e.g., proceed with reads, or potentially store writes to the store queue 213).

To summarize the foregoing, when performing speculative execution of a memory-related operation, a MU 205 might (1) identify a virtual to physical address mapping. This could cause a TLB lookup, and potentially a page walk. The end result could be an exception (which could stall the operation), a need to change a page table flag to proceed (which could stall the operation), or an address translation. If an address translation is obtained, the MU 205 might (2) proceed to probe and fill the cache and potentially perform a read. If the operation is a write, the MU 205 might (3) stall or store the write to the store queue 213. While steps (1) and (2) might get held up (but often do a substantial amount of processing), step (3) is the only one that is guaranteed to get held up (i.e., the write will not be committed to memory until it is determined that it was correctly predicted).

Speculative side channel attacks arise from the fact that the operations performed in steps (1) and (2) change state (e.g., TLB 211a entries and data cache 212a entries) and take measurable amounts of time (i.e., wall clock time and processor cycles) to perform. An attacker can, therefore, cause an instruction to execute that would do a similar amount of work as a speculatively-executed instruction of privileged software. The attacker can then measure the amount of time it takes for each instruction to execute and, if those times are similar, infer some of what was performed by the speculatively-executed instruction/operation. Using timing information, an attacker may also be able to infer whether the speculatively executed instruction had a hit in the TLB 211a, whether it caused a page walk, and/or whether it did a probe and fill in the data cache 212a.

Furthermore, it could be possible to create specially-crafted instruction sequences that include memory operations after a branch that are never intended to execute, and then cause those instructions to speculatively execute. Execution of those instructions, in turn, causes side effects (i.e., cache and TLB changes) that are not architecturally visible (i.e., an attacker may not be able to actually see cache and TLB changes), but that may still be observable through inference and experimentation.

Restricted Speculation

The inventors have recognized that processors that execute instructions in-order (i.e., non-speculatively) are generally not subject to speculative side-channel vulnerabilities, since they do not permit one speculative instruction to consume data from another speculative instruction. However, contemporary possessors owe much of their high performance to the benefits of speculative execution, since speculative execution ensures that the execution units 304 can remain as busy as possible (or practical). Recognizing these challenges, the inventors have devised mechanisms that address speculative side channel vulnerabilities—without sacrificing all of the benefits of out-of-order speculative execution.

One or more embodiments, referred to herein as "restricted speculation," leverage the security properties of in-order processors, while still allowing a substantial degree of speculative performance gain. These embodiments operate by restricting some speculative execution after a branch (or conditional load) by introducing a "restricted speculation" hazard into the out-of-order machine. These embodiments can allow speculative execution to continue after a branch (or conditional load), but also restrict speculative execution of operation(s) in situations that could cause observable side-effects if the operation(s) had been mispredicted. By restricting speculative execution in these situations, these embodiments can eliminate side channel vulnerabilities by preventing observable side effects (e.g., cache and TLB changes, timing artifacts) from happening unless it is known that the operation(s) that would cause them were correctly predicted.

Figure 3:
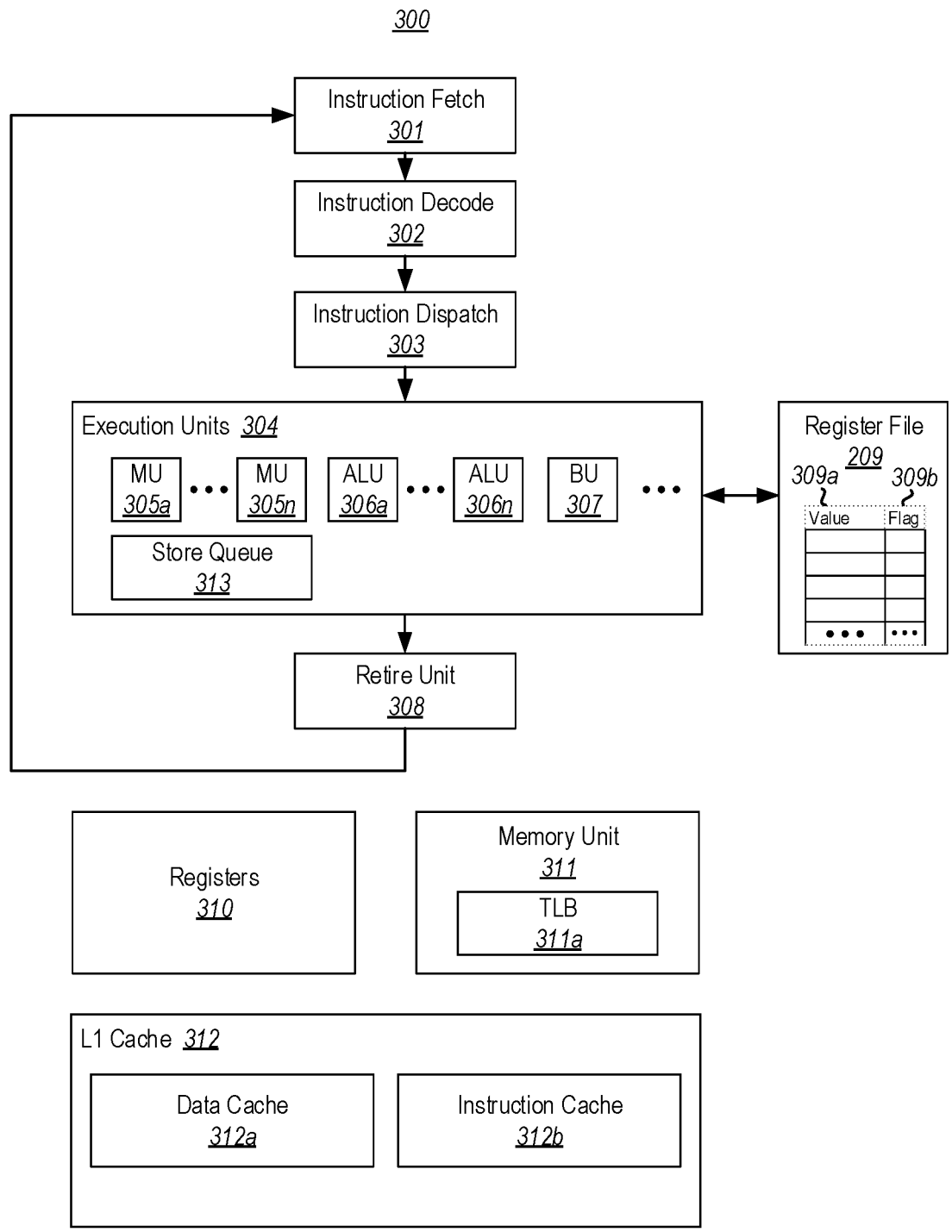
FIG. 3 illustrates an example microprocessor architecture that restricts certain speculative execution after branches.

To facilitate an understanding of these "restricted speculation" embodiments, FIG. 3 illustrates an example architecture 300 that is similar to the architecture 200 of FIG. 2, but that is expanded to restrict certain speculative execution after branches. In FIG. 3, component labels generally mirror those in FIG. 2 (e.g., the instruction fetcher 301 of FIG. 3 generally corresponds to the instruction fetcher 201 of FIG. 2, the instruction decoder 302 of FIG. 3 generally corresponds to the instruction decoder 202 of FIG. 2, etc.). Architecture 300 expands the register file 209 of FIG. 2 to include an additional flag (e.g., an extra bit/flip-flop) for each of its entries; these flags are then used to decide if the value in the entry should be used for certain operations such as memory-related operations. For example, as shown, register file 309 includes a plurality of entries, each comprising a value 309a and a corresponding flag 309b.

In register file 309, each flag 309b is used by the processor to signal whether an entry's value is hazardous because it is "pending" (and thus these flags 309b may be referred to herein as "pending flags" or a hazard). Stated differently, the flags 309b signal whether the instruction(s) that generated the corresponding value have been resolved (i.e., retired or cancelled). Flags 309b might be set in different situations. For example, some implementations set a flag 309b for an entry when its value 309a results from a memory load operation (e.g., instruction or micro-operation) that has not yet been retired or cancelled. This could include speculatively-executed memory load instructions that have not yet been determined to have been correctly executed (and retired by the retire unit 308), or that have not yet been determined to have been mispredicted (and cancelled by the retire unit 308).

Additionally, or alternatively, some implementations set a flag 309b for an entry when its value 309a results from a calculation that was derived from a register file 309 entry whose corresponding flag was set. For example, an entry's flag could be set when the entry depends on a value resulting from another speculatively-executed instruction that has not yet been resolved (i.e., determined to have been correctly predicted and retired, or incorrectly predicted and cancelled). In some embodiments, the register file 309 clears an entry's flag when the operation(s) that generated the entry's value are retired. In some embodiments, if the operation(s) are instead cancelled, then the register file 309 invalidates the entry and makes it available for re-use.

The other components in architecture 300 are configured to utilize these flags when values from the register file 309 are used. For example, if a register file 309 entry's value is used by any of the execution units 304, then that entry's flag may also made available to the execution unit. In this way, the components in architecture 300 can be made aware of whether the value they are using results from an instruction that has actually retired.

In some embodiments, components in architecture 300 could "hold" speculative work if they rely on the value 309a of a register file 309 entry whose flag 309b is set. For example, an MU 305 might receive a memory load operation that utilizes a value from the register file 309 that has a flag 309b set. This means that if the MU 305 were to execute the operation it might perform a memory load using a memory address or value that was computed by a prior speculatively-executed instruction. Thus, if the MU 305 were to perform this memory load operation, that memory operation could cause observable side-effects if the prior speculatively-executed instruction that had produced the value being used from the register file 309 were later found to have been mispredicted and is cancelled. As such, based on the flag 309b being set, the MU 305 may instead hold the operation until it is determined that the value was actually committed. Thus, the MU 305 could hold all speculative memory loads that are dependent on pending values until the pending state of those values are cleared.

The MU 305 could continue or cancel the held operation later. If the retire unit 308 later retires the instruction/operation that placed the value in the register file 309 (i.e., because it was correctly predicted), and the corresponding flag 309b is cleared, the MU 305 may proceed with the operation. Alternatively, if the retire unit 308 later cancels the instruction/operation that placed the value in the register file 309 (i.e., because it was mispredicted), and the corresponding register file 309 entry is invalidated, the MU 305 may cancel the operation.

Some embodiments further optimize the foregoing by tracking whether there are any unresolved (i.e., non-retired or non-cancelled) branches or conditional loads in the machine. If there are no unresolved branches or conditional loads in the machine, then all instructions that are "in flight" in the machine are guaranteed to be non-speculative. Thus, the register file 309 can be made "non-speculative" by clearing all of the flags 309b in the register file 309.

Other embodiments might only hold/stall execution of speculative memory loads that depend on one another, while the youngest parent branch or conditional load for the speculative memory load has yet to resolve (retire or cancel). As an exception, however, purely internal-to-the-processor store-to-load forwarding might be permitted to execute in these situations. In these embodiments, the processor could track branch state (e.g., the youngest parent branch and/or conditional load) for each instruction and update the register file 309 flag 309b for any entries modified by an instruction based on the branch state for the instruction. The processor could apply no speculation restriction on a register file 309 entry affected by an instruction if the youngest parent branch or conditional load for the instruction has resolved (i.e., by clearing the flag 309b in the register file 309 for the entry). If, however, the youngest parent branch or conditional load for an instruction has yet to resolve, and it affects a register file 309 entry, the flag 309b for that entry might be set. Thus, speculative load operations might proceed as long as no register file 308 dependency of the operation has a flag set; otherwise, speculative load operations might be blocked until the youngest parent branch of any data it relies upon has been resolved. Once a speculative load returns a result, the register file 309 entries of any operations that consume data from the speculative load may also be marked as having a restricted speculation hazard, effectively propagating the hazard.

These mechanisms ensure that speculative operations can proceed out-of-order following a branch, but that no speculative load may depend on another speculative load (except for store-to-load forwarding hits) when the youngest parent branch is still speculative and has yet to resolve. Non-load speculative operations might still be allowed to consume the results of a load that is tagged as having a restricted speculation hazard, and may still continue to execute speculatively; but the restricted speculation hazard may need to be propagated by any non-load operations, as a future load may consume the result of a non-load that itself depends on a speculative load.

When performing the forgoing, updates to branch predictors (such as a branch target cache) might be deferred until after a branch instruction has retired, in order to ensure that branch prediction structures internal to the processor (such as history tables that may predict which direction a conditional branch should take in the future) do not leak information about what has occurred based on the contents of a memory load which was subject to a restricted speculation hazard.

Deferred updates of branch predictors until branch retirement may also protect against an attack vector by which an adversary may seek to force a conditional branch to occur, and lead to an instruction cache 312b fill. If the conditional branch depended upon potentially sensitive memory contents that were speculatively loaded, and the branch prediction was speculatively updated (i.e. the "direction" of the branch was made on a prediction that was not confirmed by branch retirement), then the instruction cache fill caused by the conditional branch could cause information about the sensitive memory contents to be retained in the processor's instruction cache 312b.

In some embodiments, a processor may also have a "mode bit", setting, or other flag that is used to enable or disable restricted speculation hazard tracking. Since restricted speculation may prevent some speculative operations from being executed, there may be some marginal impact on performance in some situations. The "mode bit" can, therefore, be used to disable restricted speculation to achieve unfettered performance, while sacrificing the security benefits of restricted speculation.

Figure 4:
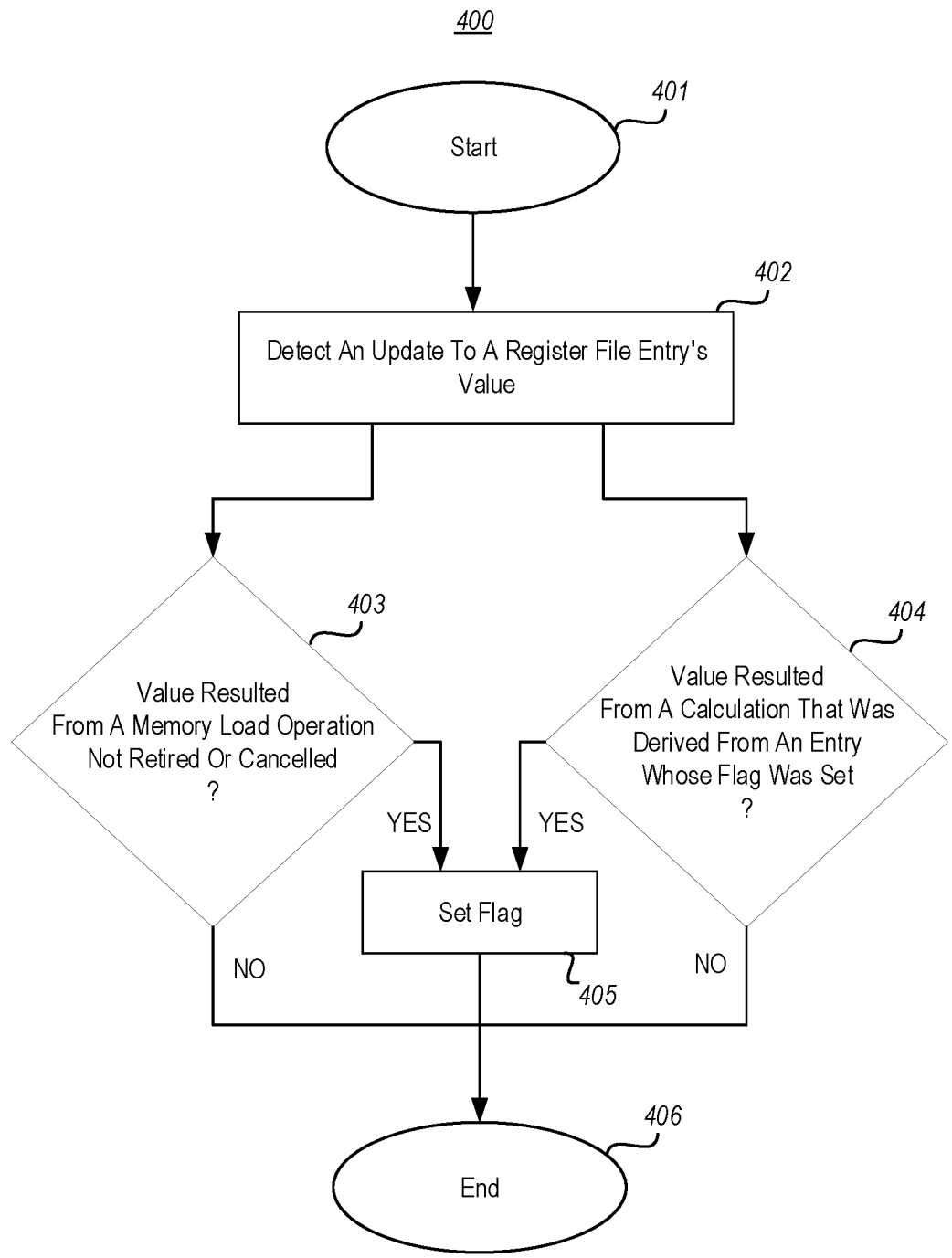
FIG. 4 illustrates an example flowchart for setting a "pending" flag in a register file.
Figure 5:
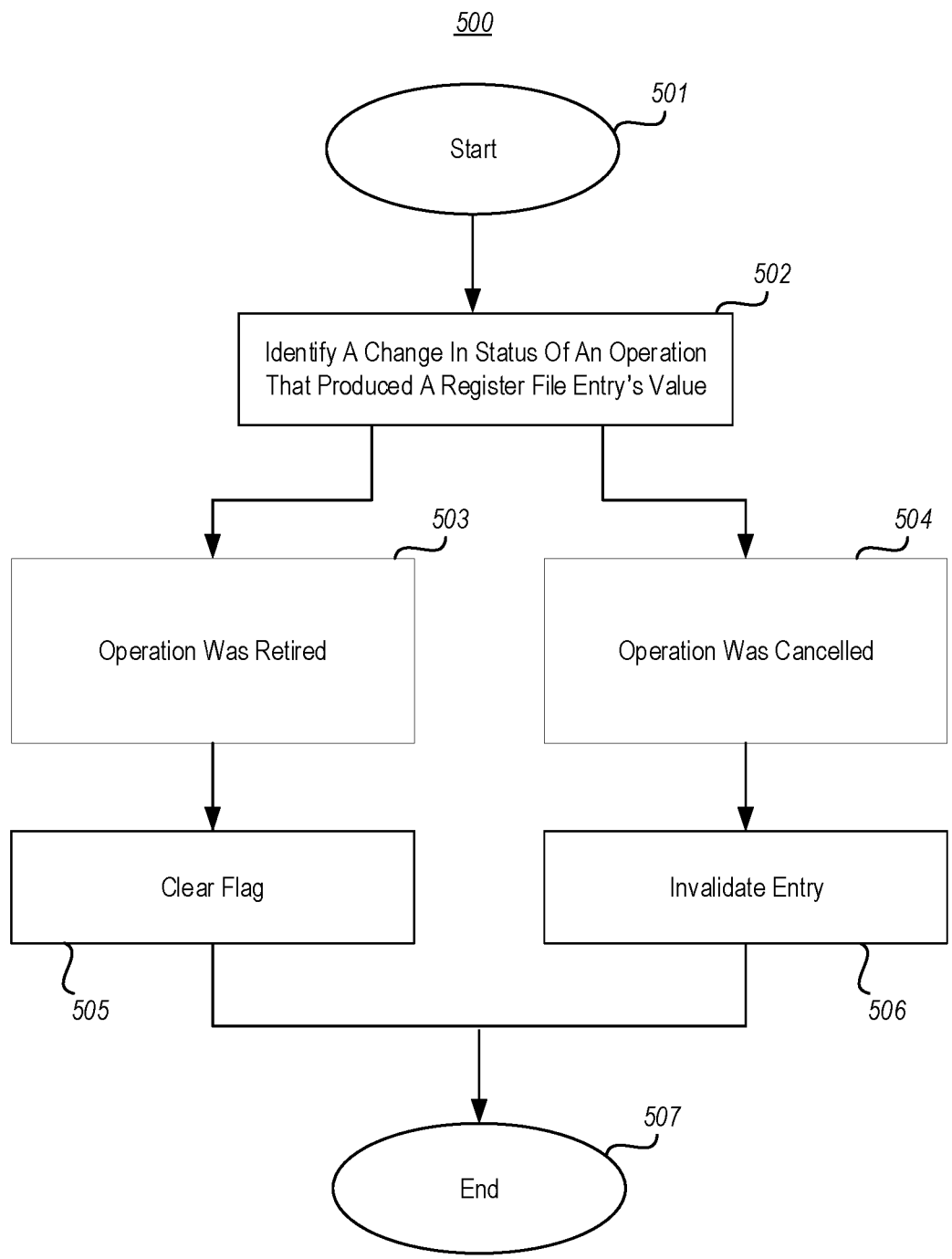
FIG. 5 illustrates and example flowchart for clearing a "pending" flag in a register file.
Figure 6:
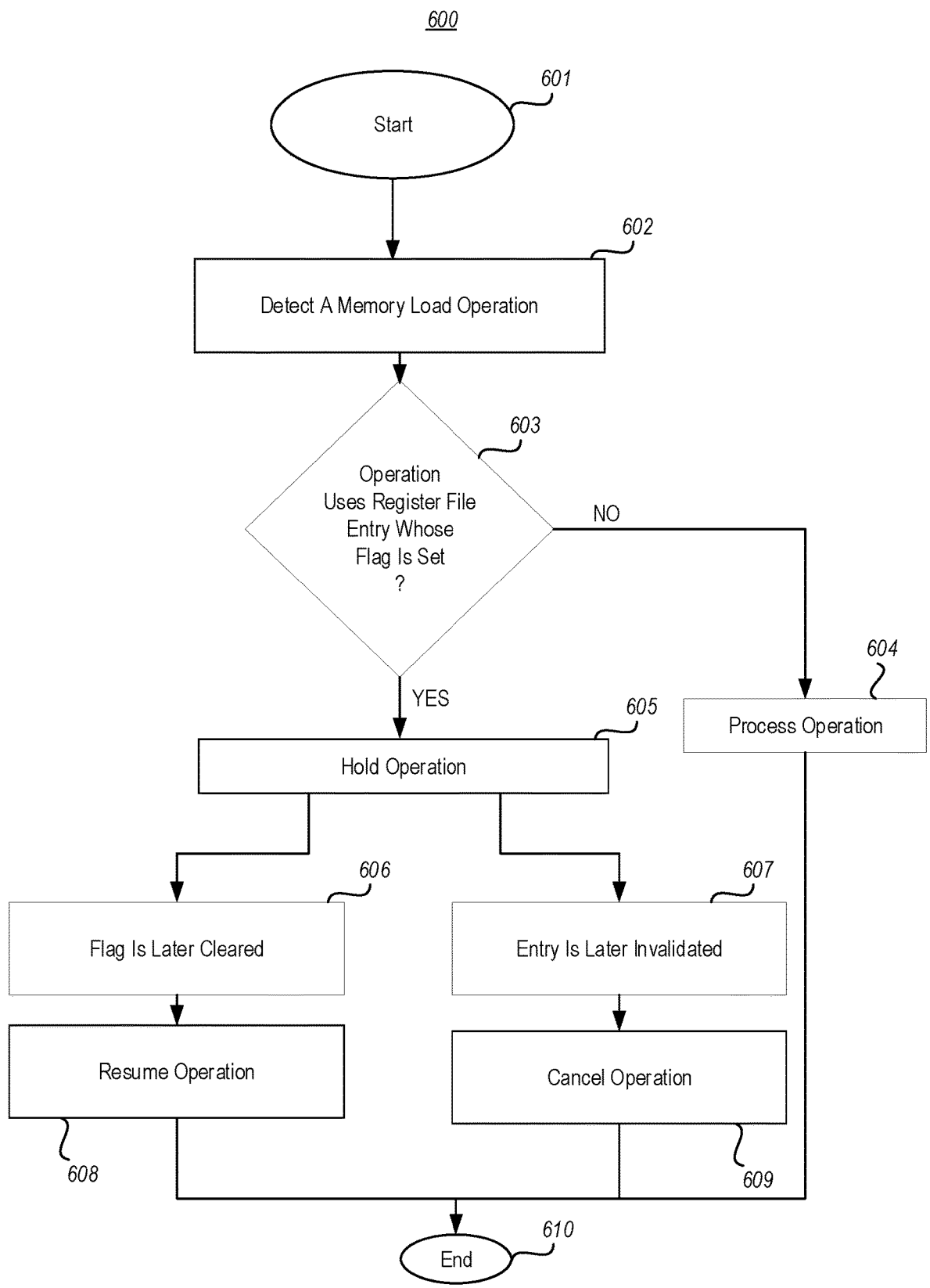
FIG. 6 illustrates an example flowchart for holding a memory load operation based on a "pending" flag in a register file.

FIGS. 4-6 illustrates example flowcharts that are usable for performing restricted speculation by a microprocessor. The flowcharts of FIGS. 4-6 are described in connection with the example environment 300 of FIG. 3. Although these flowcharts are depicted as a series of blocks or acts, it will be appreciated that the depicted ordering of these blocks or acts is not limiting to the principles described herein in any way.

Initially, FIG. 4 illustrates an example flowchart 400 for setting a "pending" flag in a register file 309. Flowchart 400 could, for example, be performed by the register file 309 based on a value being written to a register file entry. Flowchart 400 starts at 401, and proceeds to detect an update to a register file entry's value (block 402). For example, an operation executed by one of the execution units 304 could update a register value, resulting in an update to a register file 309 entry. Flowchart 400 includes two decision blocks which determine if the value resulted from a memory load operation not retired or cancelled (block 403), or if the value resulted from a calculation that was derived from an entry whose flag was set (block 404). If either of these conditions are true, the entry's flag is set at block 405, and the flowchart ends at 406. If neither of these conditions are true, the flowchart ends at 406 having not set the flag. Decision blocks 403 and 404 are depicted as being performed in parallel, although they could alternatively be performed serially (in any order).

FIG. 5, on the other hand, illustrates an example flowchart 500 for clearing a "pending" flag in a register file 309. Flowchart 500 could, for example, be performed by the register file 309 when the retire unit 308 retires or cancels an operation that affected an entry in the register file 309. Flowchart 500 starts at 501 and proceeds to identify a change in status of an operation that produced a register file entry's value (block 502). Flowchart 500 takes two branches, depending on whether the operation was retired (block 503) or was cancelled (block 504). If it was retired, the entry's flag is cleared at block 505, or if it was cancelled the entry is invalidated at block 506. The flowchart then ends at 507.

FIG. 6 illustrates an example flowchart 600 for holding a memory load operation based on a "pending" flag in the register file 309. Flowchart 600 could, for example, be performed by an MU 305. Flowchart 600 begins at 601, and proceeds to detect a memory load operation 602 (block 602). At decision block 603, it is determined whether the operation uses a register file entry whose flag is set. If the flag is not set, the operation is processed normally at block 604, and the flowchart ends at 610. If the flag was set, the operation is held at block 605. Later the flag could be cleared (block 606) or the register file entry could be invalidated (block 607). For example, the register file 309 entry could be cleared or invalidated based on flowchart 500 of FIG. 5. If it is cleared, the processing of the operation is resumed at block 608, or if it is invalidated the operation is cancelled at block 609. Either way, the flowchart ends at 610.

Implementations of one or more of flowcharts 400-600 may be embodied, for example, as a microprocessor (e.g., processor 101a), and/or one or more methods implemented thereon (e.g., as controlled by circuit logic and/or processor microcode). In these implementations, the microprocessor includes a register file (e.g., register file 309) comprising a plurality of entries, in which each entry comprises a value (e.g., value 309a) and a flag (e.g., flag 309b). In these implementations, the microprocessor may be configured to set the flag corresponding to any entry whose value (i) results from a memory load operation that has not yet been retired or cancelled (e.g., "yes" from block 403 to block 405), or (ii) results from a calculation that was derived from a register file entry whose corresponding flag was set (e.g., "yes" from block 404 to block 405). Setting a flag could mark its corresponding entry as pending. In these implementations, the microprocessor may be configured to clear the flag corresponding to any entry when the operation that generated the entry's value is retired (e.g., block 505). In some implementations, the microprocessor may include a mode bit that controls whether memory load operations are held based on register file flags.

In implementations, the microprocessor may also include a memory unit (e.g., MU 305) that is configured to hold any memory load operation that uses an address whose value is calculated based on a register file entry whose flag is set (e.g., block 605), unless all previous instructions have been retired or cancelled. In these implementations, the memory unit may continue a held memory load operation when all previous instructions have been retired, and/or may cancel a held memory load operation when all previous instructions have been cancelled.

In some implementations, the microprocessor tracks whether there are any unresolved branches, and clear all flags in the register file when there are no unresolved branches. In some implementations, the microprocessor tracks whether there are any unresolved conditional loads, and register file clears all flags in the register file when there are no unresolved conditional loads. In some implementations, the microprocessor tracks a youngest parent branch or conditional load for each instruction and holds execution of speculative memory loads that depend on one another while the youngest parent branch or conditional load has yet to resolve. When holding execution of speculative memory loads, the microprocessor may (i) permit store-to-load forwarding that is internal to the microprocessor to execute even when a speculative load operation depends on a previous speculative store operation while the youngest parent branch or conditional load has yet to resolve, and/or (ii) defer updates to a branch target cache until after a branch instruction has retired. In some implementations, the microprocessor tracks branch state for each instruction, and updates the flag corresponding to entries modified by an instruction based on the branch state for the instruction.

Accordingly, the embodiments described herein enable a processor to utilize speculative execution after a branch or conditional load, but holds some of the speculative processing if performing the processing could result in observable side effects if the operation is later cancelled as being mispredicted. This preserves much of the performance benefit of speculative execution, while mitigating against potential speculative side-channel attacks.

Speculation Buffering

One or more other embodiments, referred to herein as "speculation buffering," enable speculative execution to proceed without significant restriction, but "buffer" the effects of the speculative execution from the rest of the processor. More particularly, these embodiments allow a processor to efficiently track what processor state (e.g., changes to internal caches/buffers) is affected by speculatively-executed operations (including speculative memory accesses) using one or more speculation buffers, until the associated instructions are known to have actually executed (i.e., not have been mispredicted). If a misprediction is identified, the side effects of these state-changing operations may be "rolled back," so as to prevent the processor's normal caches/buffers from retaining a "memory" of what happened speculatively. Otherwise, if the state-changing operation(s) are retired, the changes may be committed to the normal caches/buffers.

Stated differently, embodiments of speculation buffering modify how data enters the processor cache hierarchies, in order to enable the cancellation of side effects of a speculative memory access before the processor cache hierarchies and/or buffers are disturbed by the speculative memory access. As will be recognized in view of the discussion of FIGS. 1 and 2, conventional processors typically fill cache hierarchies from the "outside in" when a load occurs. For example, as was discussed in connection with FIG. 1, data flows from the system memory 107, through remote cache hierarchies (if present), and into the requesting processor's cache hierarchy (e.g., L3 caches 106, L2 caches 105, and L1 caches 104).

Figure 7:
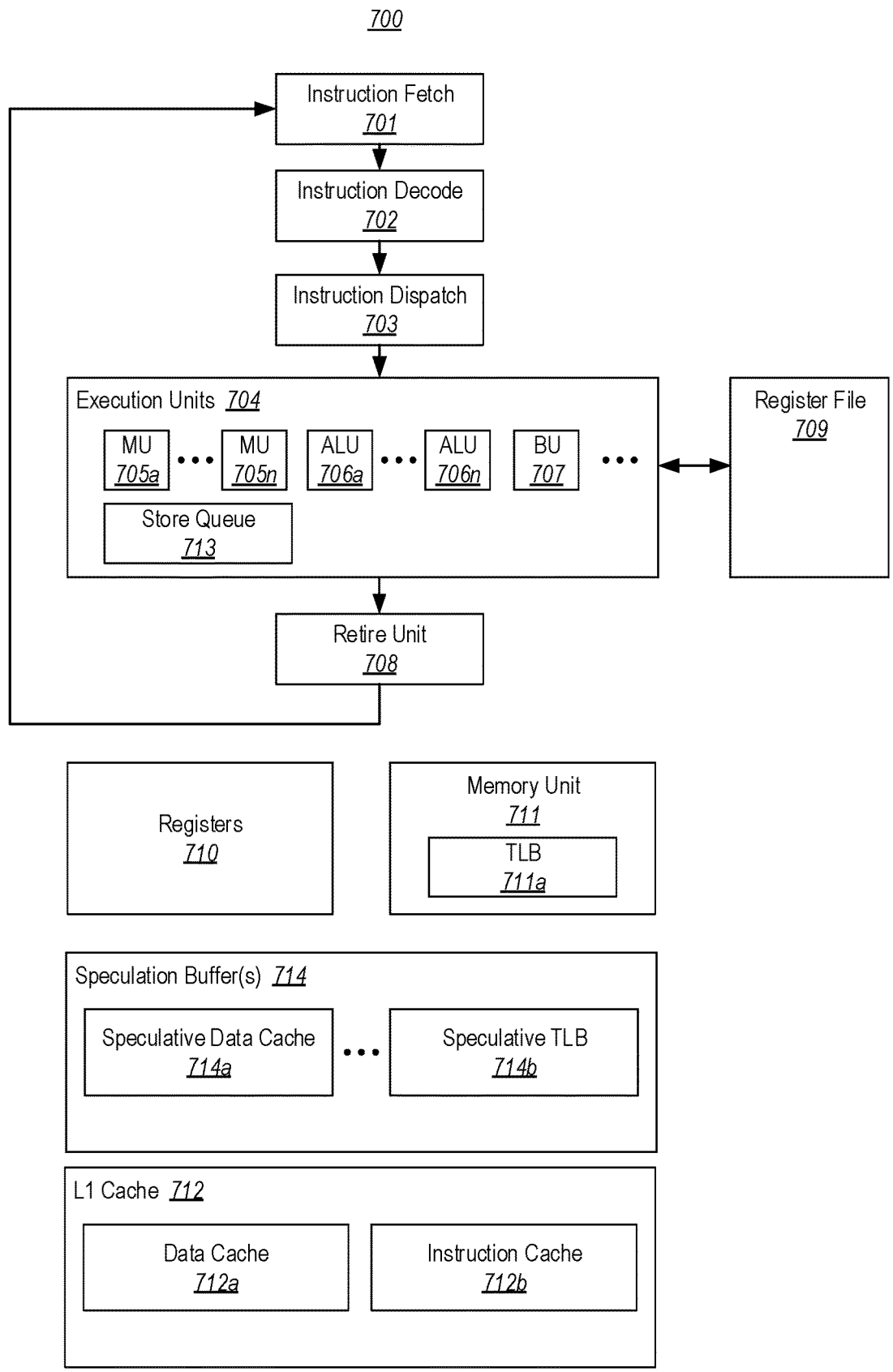
FIG. 7 illustrates an example microprocessor architecture that implements speculation buffering.

In one or more embodiments, processors that implement speculation buffering operate in a substantially different manner when satisfying reads (e.g., memory load operations), by leveraging one or more speculation buffers. For example, FIG. 7 illustrates an example architecture 700 that is similar to the architecture 200 of FIG. 2, but that is expanded to implement speculation buffering. In FIG. 7, component labels generally mirror those in FIG. 2 (e.g., the instruction fetcher 701 of FIG. 7 generally corresponds to the instruction fetcher 201 of FIG. 2, the instruction decoder 702 of FIG. 7 generally corresponds to the instruction decoder 202 of FIG. 2, etc.).

In addition to the general components of FIG. 2, the architecture 700 of FIG. 7 also includes one or more speculation buffers 714. By utilizing these speculation buffer(s) 714 to store data relating to execution of speculative loads, architecture 700 is capable of operating such that the changes to a processor's conventional cache hierarchy and/or buffers (e.g., the conventional data cache 712a, the conventional TLB 711a, etc.) that result from a load operation can be committed only once the load operation is committed to be retired. Otherwise, these changes may be discarded by removing and/or invalidating them in the speculation buffers 714.

For example, in architecture 700, speculative load operations that cause misses in the processor's L1 cache 712 (e.g., data cache 712a) may cause cache line(s) to be streamed from system memory 107 into the speculation buffer(s) 712 (e.g., speculative data cache 714a), rather than into the conventional L1 cache 712 as would be the classic behavior. These cache line(s) could then reside in the speculation buffer(s) 712 until the processor commits to retiring the load operation(s), at which time these cache line(s) could be committed to the appropriate location in the conventional cache hierarchy (e.g., the data cache 712a). If the processor instead cancels the load operation(s) (i.e., because they were mispredicted), these cache line(s) could be removed from/invalidated in the speculation buffer(s) 712. For example, these cache line(s) might be discarded as a function of a normal pipeline reset process that occurs in response to a misprediction recovery sequence, thereby erasing any evidence of the mispredicted speculative operation(s).

In some embodiments, the speculation buffer(s) 714 only contain data relating to instructions/operations that are being executed speculatively and that is actively being referenced; thus, the size of the speculation buffer(s) 714 can be kept small relative to the conventional structures they correspond to (e.g., a speculative data cache 714a may be small in size compared to a corresponding data cache 712a). Notably, when using architecture 700, any data already present in the normal caches or buffers (e.g., data cache 712a) of the processor is by definition "non-speculative." Thus, if a speculative load, causes a "hit" in the normal cache/buffer that load need not be stored in the speculation buffer(s) 714a.

While discussion of the speculation buffer(s) 714 has previously focused on buffering speculative modifications to the data cache 712a, it will be appreciated (as indicated by the ellipses) that various types of speculation buffer(s) 714 may be utilized, singly or in combination. For example, FIG. 7 also illustrates a speculative TLB 714b that buffers changes that would typically be made to the conventional TLB 711a by a speculatively-executed operation. For example, if a TLB lookup by a speculatively-executed operation misses, then a page table walk might be performed to locate a virtual to physical address mapping. Rather than storing this mapping in the TLB 711a, however, the mapping could instead be stored in the speculative TLB 714b until it is known if the operation should be committed (in which case the entry could be moved to the TLB 711a) or cancelled (in which case the entry could be discarded/voided in the speculative TLB 714b). As with the speculative data cache 714a, the speculative TLB 714b might be smaller than the TLB 711a, since it need only store entries relating to active speculative operations.

Note that, in some embodiments, speculative operations check the conventional caches/buffers first, and then check the speculation buffer(s) 714 if there was a miss. In these embodiments, speculative memory loads may first cause a lookup in the data cache 712a. If the requested cache line(s) are not in the data cache 712a (i.e., there was a miss), then they may be sought in the speculative data cache 714a. If they do not exist in the speculative data cache 714a they could then be imported into the speculative data cache 714a from a higher layer in the memory hierarchy. Later, if another speculative instruction (executing before the prior speculative instruction has been committed) causes a load involving the same cache line(s), they could first be sought in the data cache 712a. Since they would not be in the data cache 712a, they may then be sought in the speculative data cache 714a. This time, there would a "hit" in the speculative data cache 714a, and the data could be served from the speculative data cache 714a. Similar mechanisms could exist for other types of speculation buffers, such as a speculative TLB 714b.

Note that, as indicated above, conventional processors typically fill cache hierarchies from the "outside in" when a load occurs. This means that outer cache layers (e.g., L2 and L3) are filled with data from system memory 107 if there is also a cache miss in those layers. Filling of these outer cache layers could be an observable side-effect, even when using speculation buffers 714. Accordingly, some embodiments prevent these cache layers from being filled if there are misses on these layers during speculative operations. This means, for example, that an L1 speculative data cache 714a could be filled with cache line(s) directly from system memory 107, without filling the intervening cache layers (e.g., L2 and L3). Later, if these cache line(s) are committed to the data cache 712a, they could also be pushed out to these intervening cache layers, as appropriate. As such, rather than filling cache hierarchies from the "outside in" during speculative execution, as would be typical, some embodiments fill them from the "inside out" once speculative operations are committed. In order to accomplish this, the speculative data cache 714a may note where each cache line was found and only push them out as far as needed. For example, if a cache line was found in the L3 cache, then only the L2 cache might be filled. Similarly, if a cache line was found in system memory 107, then both the L3 and L2 caches might be filled. In some embodiments, the cache line found in an L3 cache may not be marked as "in use" by a speculative load. In this way, the L3 cache might remove the cache line (e.g., due to it being the least recently used and an LRU cache replacement policy) even though a speculative access actually read the data more recently than other cache lines.

In addition to filling cache hierarchies from the "inside out" to avoid observable side effects, some embodiments utilize the processor's CCP to ensure that speculative operations cause no observable side-effects (e.g., a change in CCP state for a cache line) when another processor/core uses the cache line in a shared cache scenario. In other words, when performing speculative operations, some embodiments ensure that another core's view of the CCP state of a cache line remains uninterrupted until these speculative operations are ready to be committed. The particular manner in which this is accomplished may vary depending on the CCP being used. For example, if another core has a needed cache line as "modified" or "exclusive" then speculative operation may be held until it is the oldest operation in the machine. This ensures that execution of the speculative operation will not cause a state changing operation on the CCP. To illustrate, during execution of a speculative instruction, a first processing element (e.g., physical or logical core) may able to fill a speculation buffer (e.g., a data cache), by performing a cache probe according to a CCP to obtain data from a second processing element. However, this instruction may be held (such that speculation buffer is not filled) if that cache probe would result in a cache state change in a cache (e.g., a data cache) used by the second processing element.

In some embodiments, performance could be improved by permitting a speculatively-executed instruction to fetch a value from an existing speculation buffer (i.e., multiple speculatively-executed instructions can fetch from a single speculation buffer). For example, if a first speculatively-executed instruction reads from a particular memory location, that memory location might be placed into a speculation buffer (e.g., an entry in speculative data cache 714a). Then if a subsequent speculatively-executed instruction reads from that same memory location before the first instruction completes, the subsequent instruction may be free to read the cached data from the speculation buffer even though the first instruction hasn't completed. This is because the subsequent instruction is being executed speculatively, and does not complete before the first instruction completes.

In some embodiments, multiple speculation buffers could be used to separate execution contexts. For example, different speculation buffers may be used to separate thread contexts, to separate process contexts, to provide security boundaries, etc. To illustrate, there may be a first speculation buffer that is used to store side effects of executing speculatively-executed instructions from a first thread, and a second speculation buffer that is used to store side effects of executing speculatively-executed instructions from a second thread. In some embodiments, rather than using physically separated speculation buffers a single speculation buffer could be logically segmented, such that one portion of the buffer is reserved for use with one execution context, and another portion of the buffer is reserved for use with another execution context.

Figure 8:
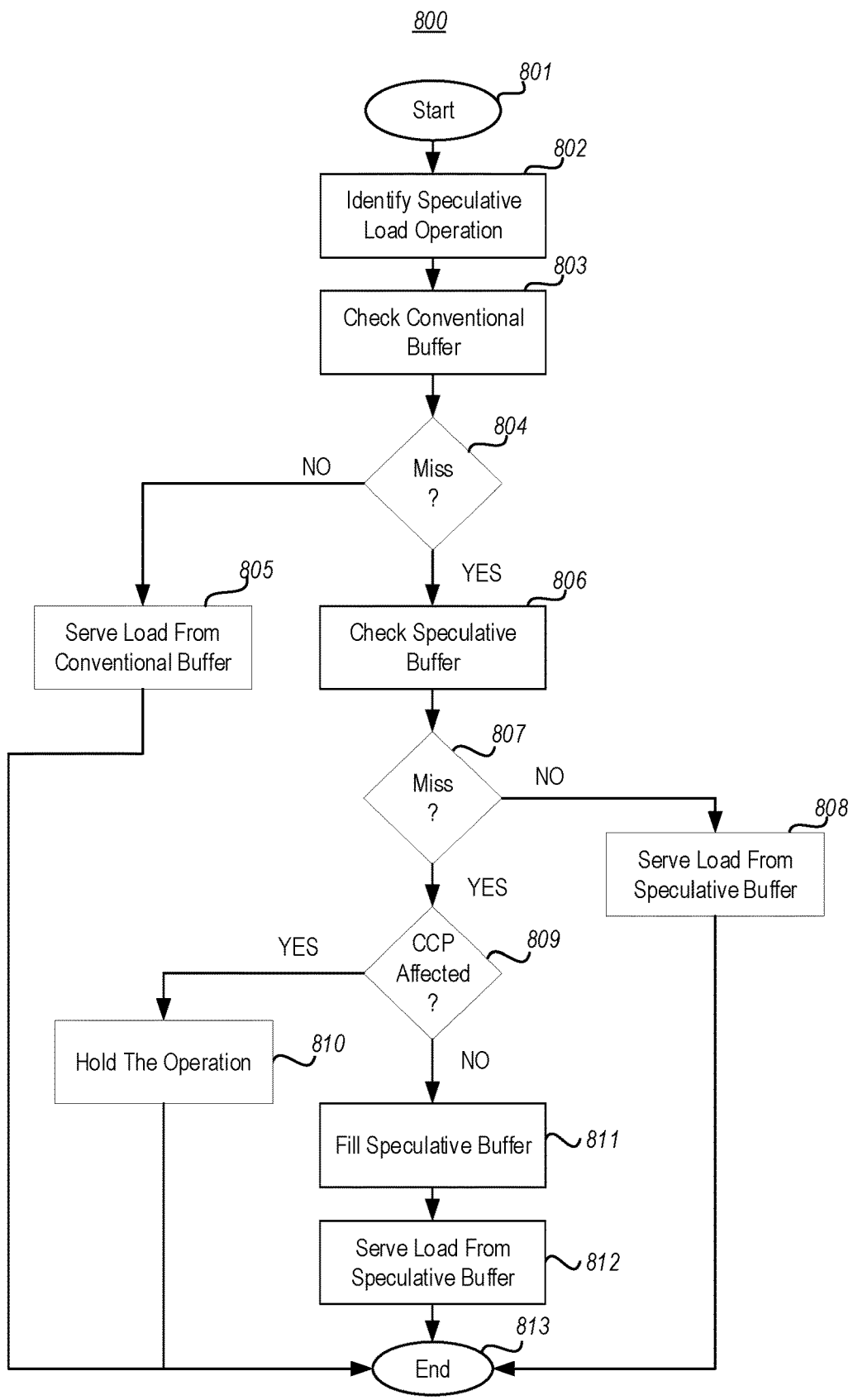
FIG. 8 illustrates an example flowchart for buffering speculative loads.
Figure 9:
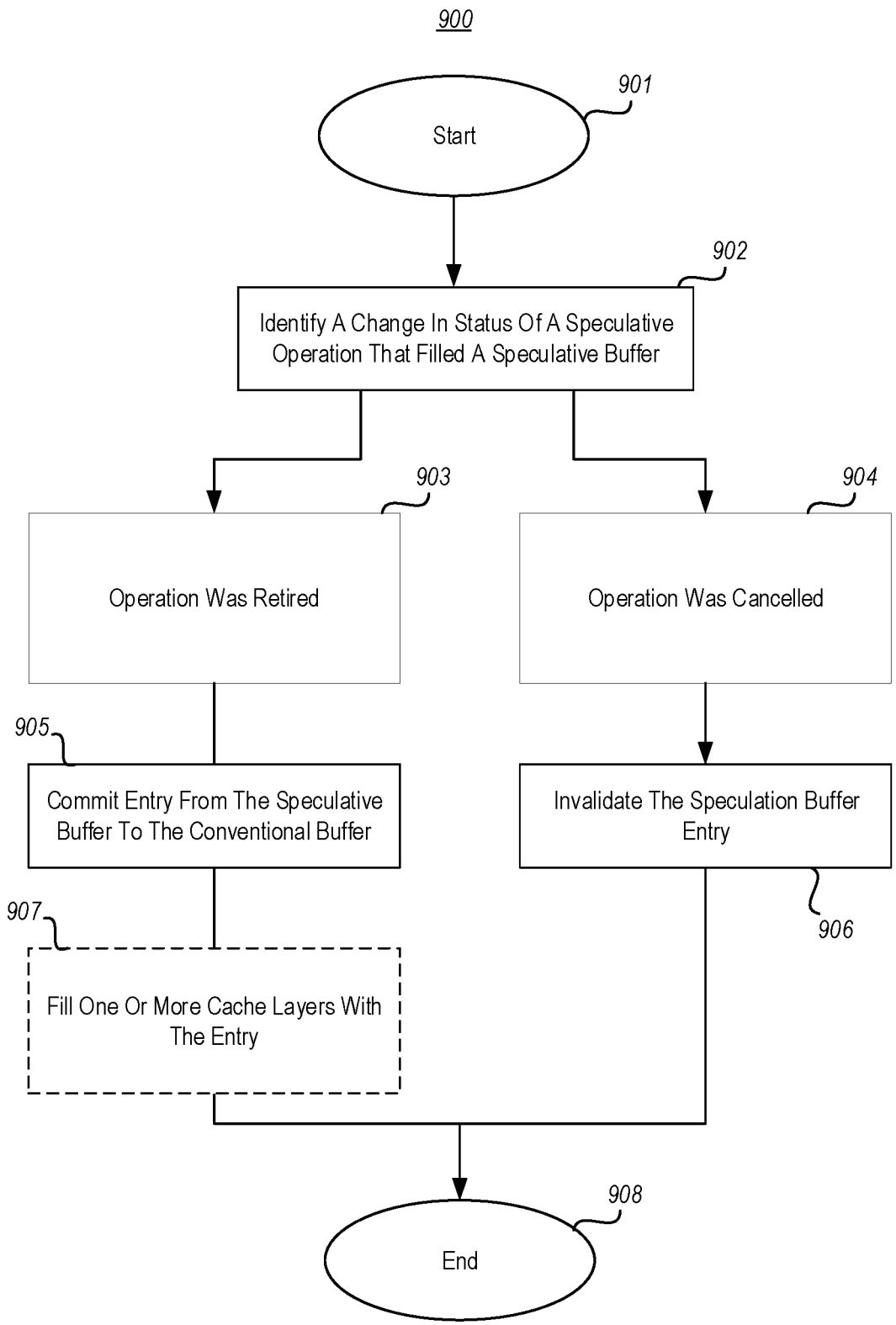
FIG. 9 illustrates an example flowchart for committing or invalidating an entry in a speculative buffer.

FIGS. 8 and 9 illustrate example flowcharts that are usable for performing buffered speculation by a microprocessor. The flowcharts of FIGS. 8 and 9 are described in connection with the example environment 700 of FIG. 7. Although these flowcharts depicted as a series of blocks or acts, it will be appreciated that the depicted ordering of these blocks or acts is not limiting to the principles described herein in any way.

FIG. 8 illustrates an example flowchart 800 for buffering speculative loads. This flowchart could be implemented, for example, in digital circuitry and/or in processor microcode. Flowchart 800 begins at 801 and proceeds to identify a speculative load operation (block 802), such as an operation dispatched by the instruction dispatcher 703. At block 803 a conventional buffer (e.g., data cache 712a and/or TLB 711) is checked for serving the speculative load (e.g., to obtain a cache line, an address translation, etc.). If there is a hit in the conventional buffer ("no" in decision block 804), then the load is served from the conventional buffer at block 805, and the flowchart ends at 813. Otherwise, if there was a miss in the conventional buffer ("yes" in decision block 804), then at block 806 a speculative buffer (e.g., speculative data cache 714a and/or speculative TLB 714b) is checked for serving the speculative load. If there is a hit in the speculative buffer ("no" in decision block 807), then the load is served from the speculative buffer at block 808, and the flowchart ends at 813. Otherwise, the flowchart proceeds to fill the speculative buffer. Initially, if the speculative buffer corresponds to a cache (e.g., speculative data cache 714a), at decision block 809 it is determined a CCP would be affected if the speculative cache were to be filled. If so ("yes" in decision block 809) the speculative operation is held at block 810, and the flowchart ends at 813. If the CCP would not be affected ("no" in decision block 809) then the speculative buffer is filled at block 811 (e.g., with a cache line in the case of a speculative data cache 714a, or an address translation in the case of a speculative TLB 714b). Then, the load is served from the speculative buffer at block 812, and the flowchart ends at 813.

FIG. 9 illustrates an example flowchart 900 for committing or invalidating an entry in a speculative buffer. This flowchart could be implemented, for example, in digital circuitry and/or in processor microcode. Flowchart 900 begins at 901 and proceeds to identify a change in status of a speculative operation that filled a speculative buffer (block 902). For example, a speculative operation could be retired (as correctly predicted) or cancelled (as mispredicted) by the retire unit 708. If the operation was retired (block 903), the entry is committed from the speculative buffer to the conventional buffer at block 905. If the speculative buffer comprises a cache (e.g., a speculative data cache 714a), flowchart 900 may include filling one or more cache layers with the entry (optional block 907). As discussed, this accomplished filling the cache from the "inside out" rather than from the "outside in), preventing side effects from mispredicted cache fills. The flowchart then ends at 908. Alternatively, if the operation was cancelled (block 904), then the entry is invalidated in the speculation buffer at block 906, and the flowchart ends at 908.

In view of the general principles described above, the following discusses some more particular example implementations of speculation buffering. Note that the following implementation examples are illustrative only, and are non-limiting.

In some implementations, a speculative data cache 714a can be viewed as an "indexable" queue of cache lines that have been referenced by instructions yet to retire—i.e., until retirement, instructions do not cause state-changing operations on the private caches of the processor, or the CCP at large. The speculative data cache 714a may be divided into a number of speculation buffer entries, each of which may include a cache line of data, addressing tag information for lookup purposes, and one or more state bits (e.g., a "pending" state, a "failed" state, and a "valid" state). Each entry holds a cache line worth of data that is first entering the cache hierarchy in a (potentially) speculative fashion, and enables any cache side effects of incorrectly speculated instruction flows to be rolled back without information leakage out of this speculative domain.

In some implementations, a speculative TLB 714b is similar in concept to the speculative data cache 714a, and holds translations that have been installed in a (potentially) speculative fashion, and which are, thus, not yet confirmed to be committed to the machine state by instruction retirement. New translations that are speculatively created may only be inserted into the speculative TLB 714b, and once at least one instruction associated with a speculative translation has retired, associated speculative TLB 714b entries can be committed into the conventional non-speculative TLB 711a. The speculative TLB 714b itself could contain an array of translations that can be looked up by address, as well as necessary paging structure attributes, similar to many conventional TLBs 711a. Some implementations may include separate speculative TLBs 714b for code and data.

In some embodiments, a "speculative load" is a specially qualified type of memory load that has properties that enable it to be issued safely by a (potentially) speculative instruction. These properties may include one or more of following: (1) speculative loads do not allocate cache lines in conventional caches, and (2) speculative loads do not cause state-changing behaviors to occur with respect to the CCP state of remote processor caches. The latter property means that a speculative load may fail if a state change would need to be performed (from a CCP perspective) due to the load.

When a memory access operation needs to access a cache line that is not present in the private cache of a core (for example, an L1 data cache 712a miss occurs), the operation may need to obtain a speculative data cache 714a entry in order to hold the data that will be loaded for the operation to make forward progress. As outlined in flowchart 800 (e.g., blocks 806 and 807), the process of allocating a speculation buffer entry may involve ascertaining whether any existing speculative data cache 714a entry exists that can satisfy the request. Some implementations may index the speculative data cache 714a, similar to some conventional L1 data caches 712a, in order to identify a speculative data cache 714a entry that already exists for the requested cache line, and if so, that speculative data cache 714a entry can be referenced by the operation for purposes of satisfying the memory access.

As shown in FIG. 8 (e.g., blocks 803 and 804), memory accesses that result in an L1 data cache 712a hit need not cause a speculative data cache 714a entry to be allocated. Some implementations may choose to allocate speculation buffer entries for all memory accesses (including those in the L1 data cache 712a), but it may also be permissible for implementations to directly access the L1 data cache 712a and circumvent speculation buffer entry allocation in the event of an L1 data cache hit (as shown in FIG. 8). However, if the L1 data cache 712a is allowed to be used speculatively in a direct fashion that avoids speculative data cache 714a entry allocation, some implementations ensure that any speculative loads issued to the L1 data cache 712a do not produce side effects (e.g., cache line replacement).

A speculative, out-of-order machine may have several memory accesses "in flight" simultaneously, and so it could be possible that multiple (potentially speculative) accesses to the same cache line may occur. In order to facilitate this, a speculative data cache 714a entry could include a "pending" state flag, which can be used to indicate whether a load for a speculative data cache 714a entry is still "in flight." Based on this pending state flag, multiple operations may then share the same speculative data cache 714a entry, if the same cache line is referenced. If an operation references a speculative data cache 714a entry that is in the "pending" state, the operation may be blocked until the speculative data cache 714a entry leaves the pending state.

If no existing speculative data cache 714a entry satisfies a memory access operation's requested cache line, then a new speculative data cache 714a entry would typically be allocated. As there exist a finite number of speculative data cache 714a entries, if no buffer entries are available, an operation may become blocked until speculative data cache 714a space becomes available. Some implementations might allow entries to be evicted from a full speculative TLB 114b, but not permit speculative data cache 714a entries to be "evicted" if the speculative data cache 714a becomes full.

In some implementations, once an operation has allocated a speculative data cache 714a entry, the speculative data cache 714a entry performs a cache line fill, via a speculative load operation that is sent through the cache hierarchy. Some implementations apply special semantics to the operation, with respect to shared caches (e.g. L2 or L3 caches that may be shared cross-core), and with respect to remote processor caches that are accessed via the cache coherency protocol. Unlike a conventional load, a speculative load does not generally allocate cache line space in any processor caches (and thus neither evicts existing cache lines, nor populates new cache lines). As a part of determining whether a speculative data cache 714a entry needs to be allocated, some implementations allow speculative data cache 714a usage to be omitted when an L1 data cache 712a hit occurs that will have already probed the L1 data cache 712a; however, higher-level caches (e.g., L2, L3) may not have yet been probed and may need to be examined by the speculative load.

Each subsequent cache level in the memory hierarchy may satisfy a speculative load out of already existing lines in each respective cache level, but, in some implementations, this causes no state-changing (e.g. cache line allocation) operations to occur. If a speculative load is satisfied from a higher-order processor cache, then in these implementations the results are returned back to the speculative data cache 714a entry, and are not allocated into the processor's L1 data cache 712a (or any other processor caches). Otherwise, the load proceeds to system memory 107 and the CCP. A speculative load satisfied in this fashion may transition its associated speculative data cache 714a entry to a "valid" state.

Once a speculative data cache 714a entry has entered the valid state, some implementations allow it to be used to satisfy memory access operations that depend on its associated cache line, and any operations blocked on the speculative data cache 714a entry may become unblocked from the perspective of the memory access dependency. In these implementations, new operations that enter the machine, and which request a cache line that has already been made valid in a speculative data cache 714a entry, may proceed to directly consume the cache line data from that speculative data cache 714a entry.

At times, speculative loads may fail to hit any caches shared directly with the local processor. In these situations, these loads may need to proceed to main memory and the CCP. From a CCP perspective, speculative loads might be specially tagged as such on the processor bus. Then, remote processor agents (e.g., other cores) may still be able to process speculative loads for purposes of returning data from processor caches; however, if a remote processor agent holds a cache line in a CCP state that would require a state change (e.g. modified or exclusive), the load may be vetoed by that processor by signaling the requesting processor that the read should be marked as "failed." In some implementations, this causes the speculative load to be completed back to the speculative data cache 714a entry with a "failed" disposition.

In some implementations, if a speculative load fails, then its associated speculative data cache 714a entry transitions to the failed state. Then, any operations that reference a speculative data cache 714a entry that has entered the "failed" state may become blocked until their associated instruction is the oldest instruction in the out-of-order machine (i.e., until that instruction is no longer speculative). This behavior may be desirable, since providing the data needed for the operation to proceed may require a state-changing operation on the CCP, which may create a speculative side channel if executed in a speculative fashion. Once an instruction is the oldest instruction in the machine, any memory access operations associated with that instruction can have the right to issue a "non-speculative" read, which may complete even if externally visible state-changing operations are required.

In some implementations, once at least one instruction retires, any speculative data cache 714a entries referenced by that instruction are eligible to be "promoted" or "committed" into the L1 data cache 712a, as these data references are no longer speculative. Implementation may choose to either keep a duplicate copy of the cache line in the speculative data cache 714a (ensuring coherency if the line is subsequently changed), or implementations may choose to re-point other instructions speculatively referencing a given speculative data cache 714a entry to the corresponding L1 data cache 712a line.

In some implementations, a speculative data cache 714a can be considered as a strictly "read only" cache from the perspective of the CCP (i.e., a cache that may exist in only the "shared" or "invalid" MSI/MESI/MOESI CCP states when viewed from the standpoint of a remote agent in the CCP). Remote agents (e.g., other processor cores, etc.) that perform CCP operations need not necessarily source data from a different processor's speculative data cache 714a entry, but operations that invalidate cache entries may still need to invalidate speculative data cache 714a entries. Thus, while normal data loads need not snoop the contents of speculative data cache 714a, cache invalidations may still need be processed by speculative data cache 714a.

In some implementations, if a speculative data cache 714a entry becomes invalidated, then any cache line contents contained within it are discarded and reloaded before that speculative data cache 714a entry can be consumed. One possible implementation that satisfies these requirements would be to place a speculative data cache 714a entry into the "failed" state if its associated line is invalidated, such that any dependent operations may only complete in a non-speculative fashion. Typically, invalidations occur because another processor has written to a cache line (or is about to do so), and thus unless invalidations due to explicit cache line flushes of shared lines are common, it may not be desirable to implement more involved semantics (e.g. immediate reload of the speculation buffer entry instead of forcing non-speculative completion) because subsequent speculative loads of the same cache line are likely to be returned with a failed disposition anyway.

The capability conferred by the speculative data cache 714a mechanism is that when a misprediction occurs, operations that have been misspeculated down a speculative path can be cancelled and rolled back, without leaking information about sensitive memory contents in the speculative domain. Any operations cancelled because of speculative execution invalidate any associated speculative data cache 714a entries, so as to erase any information about sensitive memory contents that may be encoded into which cache lines were speculatively accessed. This may be implemented by simply discarding the entire speculative data cache 714a when a pipeline flush occurs, or by discarding all speculative data cache 714a entries that were referenced by any instructions that were cancelled by a rollback (in the event that some, but not all prior instructions need be cancelled).

In at least some implementations, individual instructions can cause invalidation of a specific cache line, or invalidation of at least a portion of a specific cache line. An example of such an instruction could include the CLFUSH command in the INTEL x86 Instruction Set Architecture (ISA). Some embodiments, a speculation buffer entry could contain a directive to invalidate a specific cache line, or at least a portion of a cache line. When a speculation buffer entry contains such a directive, these embodiments may defer the directed action until the instruction which directed that action retires.

If simultaneous multithreading (SMT, or HT) is supported, some implementations ensure that speculation buffers can be appropriately cancelled when a misprediction occurs. One way to accomplish this is to split the speculation buffer between associated SMT threads (e.g., using partitioning, marking speculation buffer entries with the associated hardware SMT thread identifier, etc.).

With respect to speculative TLB's 714b, conventional TLB 711a stores cached page translations, and, as a result, represents another potential cache within which information about operations in the speculative domain can be encoded. As such, the TLB 711a may need to also be treated in a speculative-aware fashion in order to avoid creating a speculative side channel. Thus, embodiments introduce the concept of a speculative TLB 714b which, as discussed above, is generally analogous to a scaled back speculative data cache 714a—i.e., any translations that are installed into the speculative TLB 714b may be tracked and discarded when a rollback due to misspeculation occurs.

In some implementations, when a translation is needed to satisfy a memory access, the conventional TLB 711a is searched for a matching translation; if found, such a translation is used by the memory access operations. If, however, a translation does not exist, then the speculative TLB 714b is searched for a matching translation. Note that this step could potentially optionally occur in parallel with the conventional TLB 711a search. A matching speculative TLB 714b entry can be consumed to translate an address, similar to a conventional TLB 711a hit.

If no speculative TLB 714b hit(s) for a given translation occur, then some implementations invoke a page miss handler to perform a speculative TLB fill. In some embodiments, a speculative TLB fill is similar to a conventional TLB fill, except that only non-state-changing operations may occur (i.e., access/dirty-bit changes might be forbidden as these could result in side effects being committed while the associated operation may still be speculative), and the results of the translation are inserted into the speculative TLB 714b if a translation is formed.

If an operation would invoke an access/dirty-bit change, then some implementations block the operation until its associated instruction is the oldest instruction in the machine (i.e., the instruction is no longer speculative). The processor may optionally track speculative TLB 714b entries as "failed" or "pending", similar to the state machine described for speculative data caches 712a, in order to avoid redundant failed page walks.

Once an instruction retires, any speculative TLB 714b entries that were created by that instruction may be eligible to be written back to the conventional TLB 711a. In some implementations, it is at this point that eviction and replacement of conventional TLB 711a entries can occur, as the side effects of instruction are permissible to become visible once the instruction is no longer speculative.

Consideration may also be made for cache-management instructions. Processors commonly implement various cache-management instructions that allow software to directly control the state of processor caches (e.g., flushing cache lines or invalidating cache lines without writing them back). Some embodiments could implement these instructions in such a way that they do not speculatively cause evictions (or other state changes) to processor caches. One mechanism to do so is to hold any cache management instructions that cause cache state changes (such as cache line eviction) until these instructions are the oldest instructions in the machine (that is, until they are known not to be speculatively executed). At such time, cache evictions may safely occur.

Note that once a cache management instruction is the oldest instruction in the machine, it may be permitted to begin executing, but some implementations may allow subsequent cache management instructions to overlap (at least to a degree). For example, if otherwise supported by the cache hierarchy of the system, it may be permissible to retire a cache line flush instruction as soon as the flush has been issued to the cache hierarchy, enabling subsequent instructions (potentially including other cache line flush instructions) to immediately begin executing, even if some time may be required for other cache hierarchies to complete the requested flush operation.

The discussion of caches has focused primarily on data caches. However, the L1 instruction cache 712b may also present a speculative side-channel, in that there may be instruction cache lines that are only filled conditionally, based on a sensitive memory value. For example, based on a sensitive memory value, an indirect branch to a code location may occur, with the branch target varying based on the sensitive memory value. An attacker may then attempt to execute several of the possible branch targets, and time the resulting execution latency in order to ascertain whether there was an L1 instruction cache 712b hit for a branch target that was primed by a speculative, non-architected code path. In order to avoid this situation, an implementation could avoid updating branch predictors 707 with speculative results. That is, if all instruction fetches are driven by branch predictions that are only updated at branch retirement time, no information from a speculative, non-architected code path can leak out through the instruction cache.

Some processors also provide hardware support for self-modifying-code, which can present additional instruction cache 712b considerations. Many processors that provide hardware support for self-modifying-code implement a mechanism that detects when a cache line that is being modified also resides in the instruction cache 712b, and will cause an eviction of the affected instruction cache lines (and a pipeline flush if instructions from that cache line were already potentially executing, so as to ensure that subsequent execution from a modified cache line makes visible the new, modified code contents). Some implementations ensure that this eviction of cache lines does not occur speculatively without a mechanism to roll back the eviction. One mechanism to deal with hardware support for self-modifying-code is to hold any instructions triggering the processor's self-modifying-code mechanism until those instructions are the oldest instruction in the machine (that is, until they are known not to be speculatively executed). At such time, cache evictions may safely occur.

Implementations of flowcharts 800 and 900 may be embodied, for example, as a microprocessor (e.g., processor 101a), and/or one or more methods implemented thereon. In these implementations, the microprocessor includes one or more speculation buffers (e.g., a speculative data cache 714a) that are separated from and correspond to one or more conventional buffers (e.g., data cache 712a). In these implementations, the microprocessor can include first logic (e.g., circuitry and/or microcode) that records the effects of one or more speculatively-executed instructions to the one or more speculation buffers, and that records the effects of non-speculatively-executed instructions to the one or more conventional buffers (e.g., per flowchart 800). In these implementations, the microprocessor can include second logic (e.g., circuitry and/or microcode) that (i) commits the recorded effects from the one or more speculation buffers to the one or more conventional buffers when the one or more speculatively-executed instructions that generated the effects are committed, and that (ii) discards the effects from the one or more speculation buffers when the one or more speculatively-executed instructions are cancelled (e.g., per flowchart 900). In some implementations, the microprocessor holds a speculatively-executed instruction when a speculation buffer is full. In some implementations, the microprocessor updates branch predictors only with results from committed instructions.

If, as given in the example, above, the one or more speculation buffers comprise a speculative data cache and the one or more conventional buffers comprise a data cache, then the effects of one or more speculatively-executed instructions could comprise a stored cache line. In this example, committing the recorded effects from the one or more speculation buffers to the one or more conventional buffers could comprise committing the cache line from the speculative data cache to the data cache. In these situations, the first logic could fill the speculative data cache with a cache line from system memory, without filling one or more intermediary caches, and committing the recorded effects could comprise filling one or more of the intermediary caches with the cache line. Additionally, or alternatively, first logic could fill the speculative data cache with a cache line from a first intermediary cache, without filling a second intermediary cache that is between the data cache and the first intermediary cache in a memory hierarchy. In this situation, committing the recorded effects could comprise filling the second intermediary cache with the cache line.

Some embodiments apply fill speculative data caches across processing elements (e.g., cores). In these embodiments, the one or more speculation buffers could comprise a speculative data cache corresponding to a first processing element. In these embodiments, the first logic could fill the speculative data cache for a speculatively-executed instruction by employing a cache probe in accordance with a CCP to obtain data from a second processing element. In these embodiments, the speculatively-executed instruction might be held without filling the speculative data cache if the cache probe would result in a state change in a data cache of the second processing element.

In some implementations, the one or more speculation buffers comprise a speculative TLB (e.g., speculative TLB 714b), and the one or more conventional buffers comprise a TLB (e.g., TLB 711a). In these implementations, the effects of one or more speculatively-executed instructions could comprise a memory address translation, and committing the recorded effects from the one or more speculation buffers to the one or more conventional buffers could comprise committing the memory address translation from the speculative TLB to the TLB.

In some implementations, the one or more speculation buffers include a first speculation buffer that is used by first speculatively-executed instructions from a first context, and a second speculation buffer that is used by second speculatively-executed instructions from a second context. These contexts could comprise different threads, different processes, different security contexts, and the like. In these implementations, the first speculation buffer could be a first segment of a buffer, and the second speculation buffer could be a second segment of the buffer.

In some implementations, the first logic fills a speculation buffer entry based on execution of a first speculatively-executed instruction, and a second speculatively-executed instruction retrieves data from the speculation buffer entry prior to the first speculatively-executed instruction completing. In some implementations, a speculatively-executed instruction causes invalidation of at least a portion of a specified cache line, and the invalidation is deferred until the speculatively-executed instruction retires. In these implementations, the invalidation may be deferred based on a directive contained in a speculation buffer entry corresponding to the specified cache line.

Accordingly, the embodiments described herein enable a processor to utilize speculative execution after a branch or conditional load, and avoids observable side-effects of memory loads during this speculative execution by buffering the results/effects of those loads into one or more speculation buffers. If the load was correctly predicted, then these buffered results/effects can be committed to conventional buffer(s), such as a data cache or a TLB. If the load was incorrectly predicted, then these buffered results/effects can be discarded.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A microprocessor, comprising:
a register file comprising a plurality of register file entries, each register file entry of the plurality of register file entries comprising a corresponding value and a corresponding flag, the microprocessor configured to:
set a first flag corresponding to a first register file entry of the plurality of register file entries based at least on determining that the first register file entry has a corresponding first value that (i) results from a memory load operation that that has not yet been retired or cancelled, or (ii) results from a calculation that was derived from a register file entry having a corresponding flag that was set; and
clear a second flag corresponding to a second register file entry of the plurality of register file entries when an operation that generated a second value of the second register file entry is retired; and
a memory unit that uses flags corresponding to register file entries to determine whether to process memory load operations, the memory unit being configured to:
based on the first flag corresponding to the first register file entry being set, hold a first memory load operation that uses a first address that is obtained based on the first value of the first register file entry, unless all previous instructions have been retired or cancelled, thereby restricting speculative execution of the first memory load operation and preventing at least one memory timing side-effect that would result from execution of the first memory load operation; and
based on the second flag corresponding to the second register file entry being not set, process a second memory load operation that uses a second address that is obtained based on the second value of the second register file entry.

2. The microprocessor of claim 1, wherein setting a flag marks its corresponding register file entry as pending.

3. The microprocessor of claim 1, wherein the memory unit continues a held memory load operation when all previous instructions have been retired.

4. The microprocessor of claim 1, wherein the memory unit cancels a held memory load operation when all previous instructions have been cancelled.

5. The microprocessor of claim 1, wherein the register file is also configured to invalidate any register file entry when an operation that generated the register file entry's value is cancelled.

6. The microprocessor of claim 1, wherein the microprocessor tracks whether there are any unresolved branches, and the register file is also configured to clear all flags in the register file when there are no unresolved branches.

7. The microprocessor of claim 1, wherein the microprocessor tracks whether there are any unresolved conditional loads, and register file is also configured to clear all flags in the register file when there are no unresolved conditional loads.

8. The microprocessor of claim 1, wherein the microprocessor tracks a youngest parent branch or conditional load for each instruction, and holds execution of speculative memory loads that depend on one another while the youngest parent branch or conditional load has yet to resolve.

9. The microprocessor of claim 8, wherein store-to-load forwarding that is internal to the microprocessor is permitted to execute, even when a speculative load operation depends on a previous speculative store operation while the youngest parent branch or conditional load has yet to resolve.

10. The microprocessor of claim 1, wherein the microprocessor tracks branch state for each instruction, and updates the flag corresponding to entries modified by an instruction based on the branch state for the instruction.

11. The microprocessor of claim 8, wherein updates to a branch target cache are deferred until after a branch instruction has retired.

12. The microprocessor of claim 1, further comprising a mode bit that controls whether memory load operations are held based on register file flags.

13. A method, implemented at a microprocessor that includes (i) a register file comprising a plurality of register file entries, each register file entry of the plurality of register file entries comprising a corresponding value and a corresponding flag, and (ii) a memory unit that uses flags corresponding to register file entries to determine whether to process memory load operations, the method comprising:

setting a first flag corresponding to a first register file entry of the plurality of register file entries based at least on determining that the first register file entry has a corresponding first value that (i) results from a memory load operation that that has not yet been retired or cancelled, or (ii) results from a calculation that was derived from a register file entry having a corresponding flag that was set;

clearing a second flag corresponding to a second register file entry of the plurality of register file entries when an operation that generated a second value of the second register file entry is retired; and in the memory unit:
based on the first flag corresponding to the first register file entry being set, holding a first memory load operation that uses a first address that is obtained based on the first value of the first register file entry, unless all previous instructions have been retired or cancelled, thereby restricting speculative execution of the first memory load operation and preventing at least one memory timing side-effect that would result from execution of the first memory load operation; and based on the second flag corresponding to the second register file entry being not set, processing a second memory load operation that uses a second address that is obtained based on the second value of the second register file entry.

14. The method of claim 13, wherein setting a flag marks its corresponding register file entry as pending.

15. The method of claim 13, further comprising continuing a held memory load operation when all previous instructions have been retired.

16. The method of claim 13, further comprising canceling a held memory load operation when all previous instructions have been cancelled.

17. The method of claim 13, further comprising invalidating any register file entry when an operation that generated the register file entry's value is cancelled.

18. The method of claim 13, further comprising:
tracking whether there are any unresolved branches; and
clearing all flags in the register file when there are no unresolved branches.

19. The method of claim 13, further comprising:
tracking whether there are any unresolved conditional loads, and
clearing all flags in the register file when there are no unresolved conditional loads.

20. The A processing unit comprising (i) a register file that includes a plurality of register file entries, each register file entry of the plurality of register file entries comprising a corresponding value and a corresponding flag; (ii) a memory unit that uses flags corresponding to register file entries to determine whether to process memory load operations; and (iii) control logic that configures the processing unit to:

set a first flag corresponding to a first register file entry of the plurality of register file entries based at least on determining that the first register file entry has a corresponding first value that (i) results from a memory load operation that that has not yet been retired or cancelled, or (ii) results from a calculation that was derived from a register file entry have a corresponding flag that was set;

clear a second flag corresponding to a second register file entry of the plurality of register file entries when an operation that generated a second value of the second register file entry is retired; and in the memory unit:
based on the first flag corresponding to the first register file entry being set, hold a first memory load operation that uses a first address that is obtained based on the first value of the first register file entry, unless all previous instructions have been retired or cancelled, thereby restricting speculative execution of the first memory load operation and preventing at least one memory timing side-effect that would result from execution of the first memory load operation; and based on the second flag corresponding to the second register file entry being not set, process a second memory load operation that uses a second address that is obtained based on the second value of the second register file entry.

* * * * *